(12) United States Patent
Goldberg et al.

(10) Patent No.: US 11,379,049 B2
(45) Date of Patent: Jul. 5, 2022

(54) LOW-TRAVEL ILLUMINATED KEY MECHANISM

(71) Applicant: Apple Inc., Cupertino, CA (US)

(72) Inventors: Michelle R. Goldberg, Palo Alto, CA (US); Kathleen A. Bergeron, Los Gatos, CA (US); Paul X. Wang, Cupertino, CA (US); Alex J. Lehmann, Sunnyvale, CA (US); William P. Yarak, III, San Francisco, CA (US); Kevin C. Armendariz, San Francisco, CA (US); Zheng Gao, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 75 days.

(21) Appl. No.: 16/353,915

(22) Filed: Mar. 14, 2019

(65) Prior Publication Data

US 2019/0212831 A1    Jul. 11, 2019

Related U.S. Application Data

(63) Continuation of application No. 15/681,322, filed on Aug. 18, 2017, now Pat. No. 10,275,040.

(51) Int. Cl.
*H01H 3/12* (2006.01)
*G06F 3/02* (2006.01)
(Continued)

(52) U.S. Cl.
CPC ............ *G06F 3/0202* (2013.01); *H01H 3/122* (2013.01); *H01H 11/00* (2013.01); *H01H 13/14* (2013.01);
(Continued)

(58) Field of Classification Search
CPC .... H01H 3/125; H01H 13/14; H01H 13/7065; H01H 3/122; H01H 13/83;
(Continued)

(56) References Cited

U.S. PATENT DOCUMENTS 6,723,935 B1    4/2004   Watanabe
7,312,414 B2    12/2007  Yatsu et al.
(Continued)

FOREIGN PATENT DOCUMENTS

CN    1530802 A      9/2004
CN    104616923 A    5/2015
(Continued)

*Primary Examiner* — Ahmed M Saeed
(74) *Attorney, Agent, or Firm* — Dorsey & Whitney LLP

(57) ABSTRACT

Embodiments are directed to a low profile key for a keyboard having an overmolded support structure. In one aspect, an embodiment includes a key cap having an illuminable symbol. A support structure having a pair of overmolded wings may pivotally couple to the key cap. A switch housing may surround the support structure and connect each of the first and second wings. A tactile dome may be at least partially positioned within the switch housing and configured to bias the key cap upward. A sensing membrane may be positioned along an underside surface of the tactile dome and configured to trigger a switch event in response to a collapsing of the tactile dome caused by a depression of the key cap. A feature plate may be positioned below the sensing membrane. A light guide panel may define at least one light extraction feature that may be configured to propagate light toward the key cap and cause illumination of the illuminable symbol.

14 Claims, 19 Drawing Sheets

(51) Int. Cl.
*H01H 13/14* (2006.01)
*H01H 13/83* (2006.01)
*H01H 13/705* (2006.01)
*H01H 11/00* (2006.01)
*H01H 13/7065* (2006.01)
*H01H 13/88* (2006.01)

(52) U.S. Cl.
CPC ...... *H01H 13/705* (2013.01); *H01H 13/7065* (2013.01); *H01H 13/83* (2013.01); *H01H 3/12* (2013.01); *H01H 13/88* (2013.01); *H01H 2203/02* (2013.01); *H01H 2219/044* (2013.01); *H01H 2219/056* (2013.01); *H01H 2219/062* (2013.01); *H01H 2229/048* (2013.01)

(58) Field of Classification Search
CPC ........... H01H 2219/062; H01H 13/023; H01H 2219/036; H01H 9/161; H01H 2221/07; H01H 9/182; H01H 2219/014; H01H 2219/0622
See application file for complete search history.

(56) References Cited

U.S. PATENT DOCUMENTS

| | | | |
|---|---|---|---|
| 7,893,376 | B2 | 2/2011 | Chen |
| 8,759,705 | B2 | 6/2014 | Funakoshi et al. |
| 9,395,822 | B2 | 7/2016 | Hinz |
| 10,002,727 | B2 | 6/2018 | Kwan et al. |
| 2011/0220477 | A1* | 9/2011 | Chen ............... H01H 13/83 200/314 |
| 2011/0268487 | A1 | 11/2011 | Larsen |
| 2012/0080299 | A1* | 4/2012 | Chen ............... H01H 13/83 200/5 A |
| 2012/0199458 | A1* | 8/2012 | Takemae ......... H01H 13/14 200/5 A |
| 2012/0229389 | A1 | 9/2012 | Nishino |
| 2015/0090570 | A1 | 4/2015 | Kwan et al. |
| 2015/0338887 | A1 | 11/2015 | Farahani et al. |
| 2016/0351360 | A1 | 12/2016 | Knopf et al. |
| 2017/0125185 | A1* | 5/2017 | Lin ................. H01H 13/14 |
| 2018/0182575 | A1* | 6/2018 | Chiu ............... H01H 13/85 |

FOREIGN PATENT DOCUMENTS

| | | |
|---|---|---|
| JP | 2012186061 A | 9/2012 |
| JP | 2015219664 A | 12/2015 |
| JP | 2016531409 A | 10/2016 |
| WO | 2015047612 A2 | 4/2015 |

\* cited by examiner

LOW-TRAVEL ILLUMINATED KEY MECHANISM

CROSS-REFERENCE TO RELATED APPLICATION(S)

This application is a continuation application of U.S. patent application Ser. No. 15/681,322, filed 18 Aug. 2017, and titled "Low-Travel Illuminated Key Mechanism," the disclosure of which is hereby incorporated by reference herein in its entirety.

FIELD

The described embodiments relate generally to electronic devices, and more particularly to input devices for electronic devices.

BACKGROUND

In computing systems, a keyboard may be employed to receive input from a user. Many traditional keyboards may suffer from significant drawbacks, including occupying a relatively large portion of available interior space of a housing. In many cases, traditional keyboards include various mechanical and electrical components that may impede illumination of the keyboard and contribute to an undesirable z-stackup of mechanisms.

SUMMARY

Embodiments of the present invention are directed to an electronic device having a hidden or concealed input region.

In a first aspect, the present disclosure includes a key for a keyboard. The key includes a key cap. The key further includes a support structure supporting the key cap above a tactile switch. The support structure includes a compliant hinge. The support structure further includes a first wing molded over a first end of the compliant hinge and comprising a first protrusion. The support structure further includes a second wing molded over a second end of the compliant hinge and comprising a second protrusion. The key further includes a switch housing positioned within the cavity at least partially surrounding the tactile switch. The switch housing may define a first retention feature configured to receive the first protrusion. The switch housing may further define a second retention feature configured to receive the second protrusion. The key further includes a light guide positioned below the switch housing and configured to illuminate a symbol on the key cap. The first wing and second wing cooperate to define a cavity. Depression of the key cap may cause rotation of the first protrusion within the first retention feature and rotation and translation of the second protrusion within the second retention feature.

A second aspect of the present disclosure includes a keyboard. The keyboard includes an enclosure defining an array of openings. The keyboard further includes a first key assembly positioned within a first opening of the array of openings. The first key assembly includes a key cap and a support structure coupled to the key cap. The support structure includes a compliant hinge and first and second wings molded over the compliant hinge. The keyboard further includes a second key assembly positioned within a second opening of the array of openings. The keyboard further includes a light source positioned within the enclosure and along a periphery of the pair of key assemblies. The keyboard further includes a light guide optically coupled with the light source and extending below the first and second key assembly. The light guide may be configured to illuminate the first key assembly differently from the second key assembly.

A third aspect of the present disclosure includes a key for a keyboard. The key includes a key cap having an illuminable symbol. The key further includes a support structure having first and second wings pivotally coupled to the key cap. The key further includes a switch housing surrounded by the support structure and having a first retention feature connected to the first wing and a second retention feature connected to the second wing. The switch housing may be configured to guide movement of the first wing differentially than the second wing using the first and second retention features. The key further includes a tactile dome at least partially positioned within an opening of the switch housing and configured to bias the key cap upward. The key further includes a sensing membrane positioned along an underside of the tactile dome and configured to trigger a switch event in response to a collapse of the tactile dome. The key further includes a feature plate positioned below the sensing membrane. The key further includes a light guide defining at least one light extraction feature and configured to propagate light toward the illuminable symbol.

A fourth aspect of the present disclosure includes a method for manufacturing a support structure. The method includes extending a strip of compliant material through a form. The method further includes causing a moldable material to flow into the form. The moldable material may form a first wing molded over and extending from a first edge of the strip of compliant material. The moldable material may also form a second wing molded over and extending from a second edge of the strip of compliant material opposite the first wing. The first and second wings may define a cavity and may be separated by a portion of the compliant material. The method further includes detaching the compliant material positioned within the cavity from the first and second wings.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like elements.

FIG. 11 depicts an exploded view of another embodiment of a key assembly of

FIG. 1A;

Figure 1:
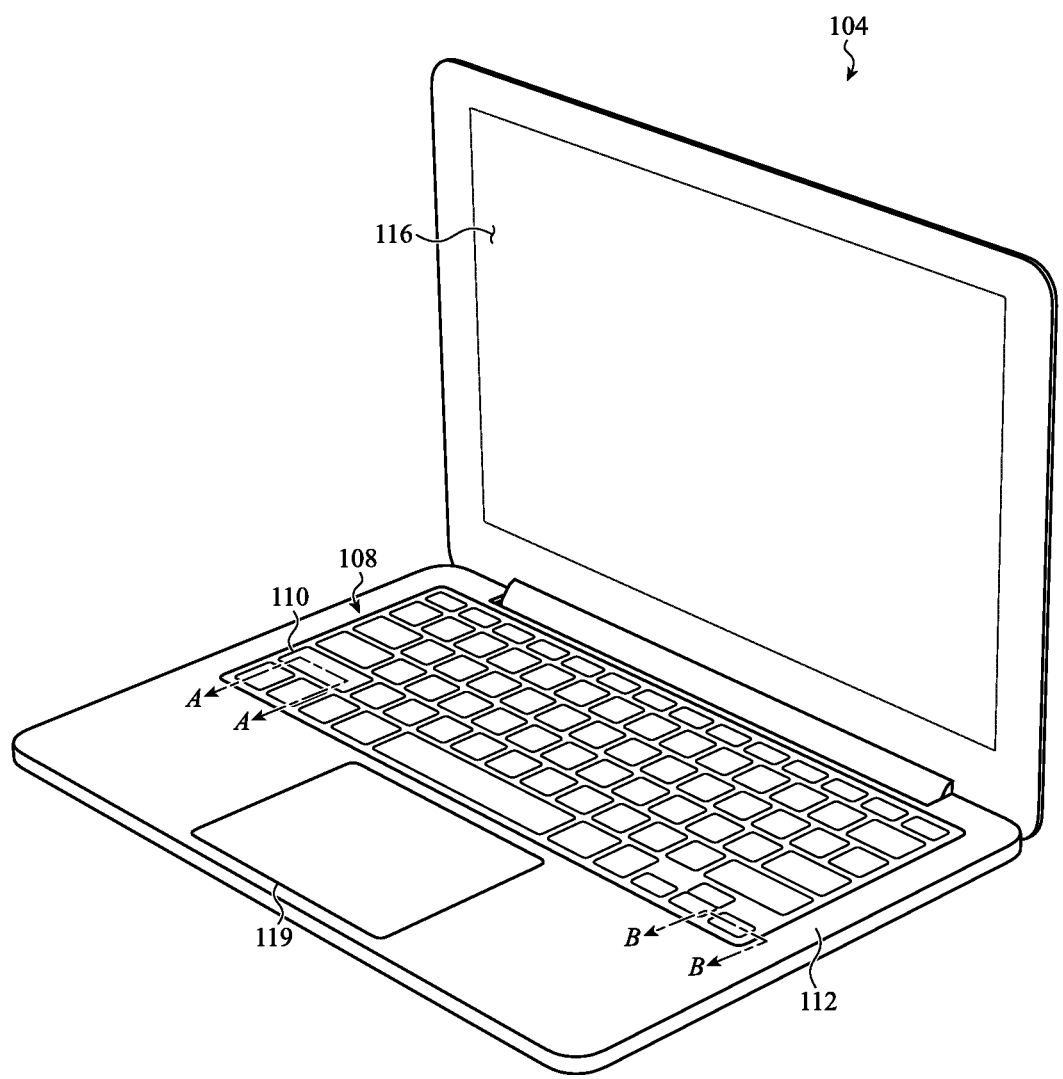
FIG. 1 depicts a sample electronic device including a keyboard.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The present disclosure describes systems, devices, and techniques related to a key assembly for an input device, such as a keyboard. The key assembly may enable substantially low travel distances of an input surface having an illuminable symbol, such as an illuminable key cap, with a desired tactile response. The key assembly uses a support structure having an overmolded living hinge to support and guide movement of the key cap. A switch housing may support and engage the support structure within the key assembly and may at least partially surround a tactile switch that is used to detect input or a mechanical press along the key cap. In many embodiments, the support structure may surround the switch housing, or otherwise be positioned outside the switch housing. For example, depression of the key cap may cause a collapsible dome of the tactile switch to collapse and close electrical contacts of a sensing membrane positioned below the tactile dome, thereby triggering a switch event. One or more light extraction features of a light guide panel (LGP) may propagate light through the key assembly, including through holes and/or transparent regions of the key assembly, and illuminate an illuminable symbol of the key cap. The illuminable symbol may remain illuminated during the substantially low-travel key stroke, which may be, in some embodiments, within a range of between 0.55 mm to 0.75 mm. However, other keystrokes are contemplated and described herein. In some cases, the tactile dome may bias the key cap upwards to deliver a desired tactile effect during the low-travel keystroke.

As used herein, the phrase "illuminable symbol" refers generally to any or all areas of (or adjacent to) a keycap or other input surface of a key that is intended to be illuminated by the light emitting element such that the location, size, and/or functionality of the key, or portion of the key, is visually emphasized. For example, a key may include a symbol or a glyph that defines an alphanumeric character, a punctuation mark, a word, an abbreviation, or any other linguistic, scientific, numeric, or pictographic symbol or set of symbols. The geometry of the key may also be an illuminable portion of the key, for example, such as a surface of the key defining a perimeter, a sidewall, a corner, and so on.

The support structure, as described herein, may be an overmolded component that pivots about a flexible or living hinge formed from a compliant material. For example, the support structure may include a pair of wings formed or molded over the compliant material and define a cavity. The pair of wings may be formed from a curable material having a greater rigidity than the compliant material such that the wings support or guide movement of the key cap while the compliant material deforms or bends to pivot the pair wings relative to one another during depression of the key cap. The wings may extend outward from the hinge in different or opposing directions, much like the wings of a butterfly. Wings can be positioned such that there is an oblique angle between them when the key is in a rest state (e.g., no exerted force on the key cap). Wings can flatten to be substantially planar when the key is fully depressed.

In an embodiment, the support structure may be formed from a substantially continuous strip of compliant material. This may improve manufacturability of the key assembly by allowing multiple support structures to be formed in succession. To illustrate, multiple pairs of wings may be molded over opposing edges of the compliant material. The compliant material may be configured to resist chemical or physical changes during a forming or curing of the wings, thereby maintaining its compliant characteristic and forming a flexible hinge between wings of a given set. After the wings are molded over to the compliant strip, the strip may be cut away or detached to yield an individual support structure that is suitable for use in a key assembly.

Various protrusions, pins, or other features may extend from the wings and engage corresponding features of the key assembly. For example, the support structure may include key cap engagement structures that extend away from a cavity defined by the wings and pivotally couple and support the key cap above the switch housing and tactile switch elements of the key assembly. Further, the support structure may include various sets of protrusions or other features that extend to the cavity defined by the wings, and which may be received by, and supportively engaged with, the switch housing. In some cases, at least some of the various sets of protrusions may be upstop features that limit upward expansion of the key cap.

The switch housing supports the support structure within the key assembly. Retention features formed along sides of the switch housing may receive and engage protrusions of the support structure. The protrusions may rotate within corresponding ones of the retention features during depression of the key cap. In some cases, at least one of the protrusions may also translate within the retention feature during depression of the key cap. For example, at least one of the retention features may be an elongated structure configured to facilitate sliding of the protrusion of the support structure therein. This may allow the wings of the support structure to move toward one another during depression of the key cap, which may improve the z-profile of the key assembly.

As described herein, the key assembly may be actuated using a tactile switch. The tactile switch may include a tactile or collapsible dome and a sensing membrane. The tactile dome may be a substantially non-conductive structure and may include a contact feature along an underside surface of the tactile dome that impacts electrical contacts of a sensing membrane when the tactile dome collapses or buckles. However, in other cases, the tactile dome may include a conductive puck or other electrical element used to trigger a switch event. In this regard, in a particular configuration, the sensing membrane may include two deformable layers separated by a spacer having an opening. The opening may define a cavity between the deformable layers and at least partially contain or surround electrical contacts of the sensing membrane attached to respective ones of the deformable layers. As the tactile dome buckles, the contact feature may pinch or press the deformable layer along the cavity and cause the sensing membrane to trigger a switch event in response to a contact between the electrical contacts. A relief or other void, for example, within a feature plate or other structure of the key assembly may allow the sensing membrane to momentarily move or otherwise deform downward and produce a desired tactile effect.

In addition to optionally providing a relief area for the depression or deformation of the sensing membrane, the feature plate may be used to structurally support the switch housing within the key assembly. For example, the feature plate may include various engagement features stamped or otherwise formed from a body of a substantially planar structure of the feature plate. The engagement features may extend upwards from the key cap and engage or couple with the switch housing. In certain embodiments, the engagement features may be barbs or tabs stamped or cut out from a body or sheet of metal material used to form the feature plate.

The key assembly may be a light-transmissible structure, such that light from below or within the key assembly may travel up towards the key cap and illuminate an illuminable symbol. To facilitate the foregoing, various openings or holes may be formed in one or more components of the key assembly. For example, the sensing membrane and/or the feature plate may define numerous openings or holes that allow light to pass through the key assembly. Further, some components of the key assembly may be transparent or include a partially transparent region, such as the switch housing and/or the tactile switch.

In an embodiment, an illuminable symbol of the key cap may be illuminated using a light guide panel (LGP) extending below the feature plate. In particular, the LGP may define or be coupled with light extraction features that expel light from the LGP and direct the expelled light toward the key cap. The light extraction features may be specifically tailored to exhibit an optical characteristic (e.g., light path, brightness, contrast, interference pattern, and so on) that correspond to a particular illuminable symbol of the key cap. This may allow the light extraction feature to illuminate the illuminable symbol according to a predetermined optical effect (e.g., such as maximizing a brightness of the illuminable symbol on the key cap).

The LGP may extend along and/or beneath multiple key caps and corresponding key assemblies. One or more light sources, which may be arranged substantially along a periphery of the keyboard, may emit light into the LGP. The LGP may thus transfer light from the light source toward the various key assemblies of the keyboard, and ultimately toward the respective key caps of the key assemblies via the light extraction features. In this regard, the LGP may define or be coupled with multiple distinct light extraction features positioned under corresponding ones of the key caps. Each light extraction feature or features may be tailored to exhibit an optical characteristic corresponding to the particular illuminable symbol of a given key assembly. This may allow the LGP to illuminate a first key cap in a manner that is distinct from a second key cap. This may be desirable in order to illuminate distinct alpha-numeric characters, or other characters or glyphs, formed by the various illuminable symbols of the key assemblies according to distinct predetermined optical effects.

It will be appreciated that while the foregoing key assemblies are described with respect to a full or complete support structure (e.g., one having a cavity defined by the respective first and second wings of a pair of wings), the embodiments described herein are not limited as such. For example, some embodiments may use a modified-support structure, which may be useful to support and engage relatively smaller keyboard keys, such as one or more keys having an illuminable symbol that defines an arrow. As such, the modified-support structure may be defined by a set of wings having a major arm and a minor arm that is shorter than the major arm. The major arms of the modified-support structure may be overmolded about a hinge formed from a compliant material, as described herein. The modified-support structure may be used within the keyboard assembly in conjunction with a modified switch housing. The modified switch housing may define a semi-circular recess that is positioned along a first side of the tactile dome opposite a second side of the tactile dome that is positioned along the hinge and major arms of the set of wings of the modified-support structure. Substantially analogous to that of the support structure introduced above, the modified-support structure may also include protrusions, pins, bars, or other features that engage an underside of the switch housing. In some cases, the modified-support structure may include a bar that extends between the major and minor arms of one or both of the wings, and through the switch housing, to support the modified-support structure during depression of the key cap.

Various other embodiments include other overmolded components, which may also aid in manufacturability and reduce the z-stackup of the key assembly. In a sample implementation, the switch housing may be an overmolded component that is molded over the tactile dome and, thus, collectively define an integrated dome switch housing. This may allow for various different shapes and sizes of the switch housing, which may accommodate different types of support structures and associated coupling structures. For example, the overmolded switch housing may allow the support structure to connect to the key assembly using a bar extending across one or both of the wings and through the switch housing.

One or both of the overmolded switch housing and/or the tactile dome may be transparent or include a partially transparent region such that light from within the key assembly (e.g., from a given light extraction feature) may travel through the tactile dome and/or overmolded switch housing and illuminate an illuminable symbol of the key cap. Additionally or alternatively, the overmolded switch housing may include light channels that direct light through the overmolded switch housing and toward an underside of the key cap. The light channels may exhibit various optical characteristics that support an optimal or maximum illumination of the illuminable symbol, as may be appropriate for a given application.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1 depicts an electronic device 104 having a key assembly 108, although other input mechanisms may incorporate the embodiments discussed herein. The key assembly 108 may be one of a set of key assemblies that collectively form a keyboard or other input structure of the electronic device 104. The key assembly 108 may include a stack-up of components that cooperate to initiate an input signal in response to a force input. The key assembly 108 may enable substantially low-travel of an input surface with a desired tactile response. The key assembly 108 may include a support structure having an overmolded living hinge, such as the support structure discussed above and described in greater detail below. As described herein, the support structure may be pivotally coupled to a switch housing and used to support and guide movements of a key cap. The key cap may be used to trigger a switch event of the tactile switch by impacting a tactile dome such that electrical contacts of a sensing membrane close, although other embodiments are contemplated and described herein.

In a non-limiting example, as shown in FIG. 1, the electronic device 104 may be a laptop computer. However, it is understood that electronic device 104 may be any suitable device that operates with the key assembly 108 (or any other suitable device or input mechanism configured to receive a touch and/or force input from a user). Some example electronic devices may include data-entry devices, word-processing devices, desktop computers, notebook computers (as shown in FIG. 1), smart phones, tablets, portable media players, or the like. Other examples of electronic devices may include health monitoring devices (including pedometers, heart rate monitors, or the like), and other electronic devices, including digital cameras, printers, scanners, security systems or devices, electronics for automobiles, among other electronic devices. Suitable input mechanisms may include trackpads, mice, joystick buttons, and so on.

For purposes of illustration, FIG. 1 depicts the electronic device 104 as including the key assembly 108, an enclosure 112, a display 116, and one or more input/output members 119. It should be noted that the electronic device 104 may also include various other components, such as one or more ports (e.g., a charging port, a data transfer port, or the like), communications elements, additional input/output members (including buttons), and so on. As such, the discussion of any computing device, such as the electronic device 104, is meant as illustrative only.

In a non-limiting example, the key assembly 108 may include a key cap 110. The key cap 110 may have an illuminable portion or symbol at which light from a light source may visually emphasize a location, size, and/or functionality of the key cap 110. The key cap 110 may be substantially surrounded by, and at least partially protrude from, the enclosure 112. For example, the key cap 110 may be positioned within, or partially within, one of an array of openings defined in the enclosure 112. The key cap 110 may be configured to receive a force input. The force input may depress the key cap 110 and trigger one or more input signals that may control the electronic device 104. As depicted, the key assembly 108, and associated keyboard, may be positioned within the electronic device 104 (e.g., within, or partially within, the enclosure 112). In other embodiments, the key assembly 108 may be a distinct, standalone component communicatively coupled with the electronic device 104 via a wireless or hardwired connection.

Figure 2A:
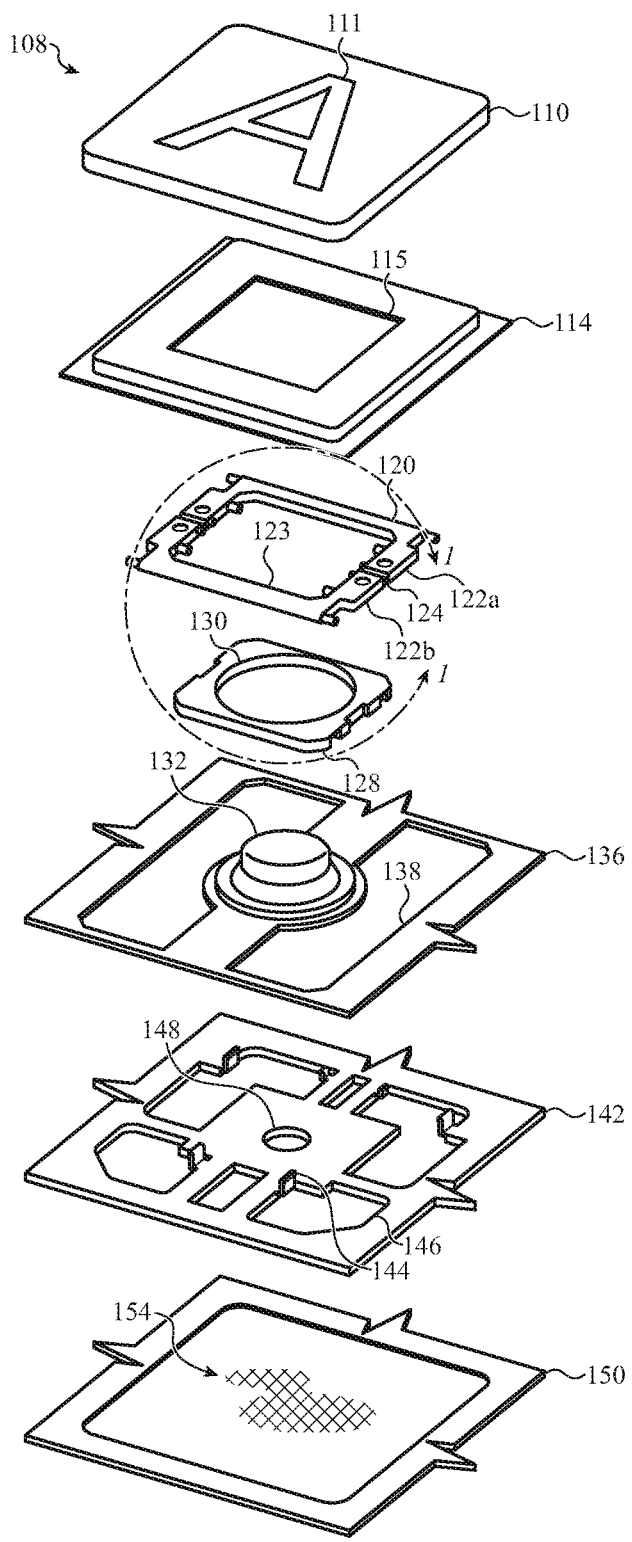
FIG. 2A depicts an exploded view of a key assembly of FIG. 1.

FIG. 2A depicts an illustrative exploded view of an embodiment of the key assembly 108 shown in FIG. 1. As described above, the key assembly 108 may be formed from a stack-up of separate components. Each layer and/or component of the stack-up of the key assembly 108 may provide different functionality and/or operations for the electronic device 104, as discussed herein. Although a key assembly 108 is shown as a single key stack-up, it is understood that any or all keys (including a subset of keys) of the electronic device 104 may be formed from similar components and/or layers in a similar configuration and/or function in a substantially similar manner as the single key stack-up shown in FIG. 2A.

As described above with respect to FIG. 1, the key assembly 108 includes the key cap 110. The key cap 110 may define an input surface of the key assembly 108 and is similar to other possible input surfaces such as mouse buttons, trackpads, joystick buttons, standalone buttons, and so on. For example, the key cap 110 may be configured to receive a force input or mechanical press to actuate one or more switches of the key assembly 108. The key cap 110 may include an illuminable portion (e.g., a glyph, symbol, sign, and/or geometric feature, which may be formed on surfaces, regions, perimeters, sidewalls, corners, and so on) that is intended or configured to be illuminated by a light source of the key assembly 108. As shown in FIG. 2A, the key cap 110 includes an illuminable symbol 111.

The key cap 110 may be seated on or within a collar 114. The collar 114 may form a protective barrier between an interior of a device enclosure (e.g., enclosure 112 of FIG. 1) and an external environment experienced by the key cap 110. For example, the collar 114 may be positioned along, or coupled with, an underside surface of the key cap 110 and prevent dirt, dust, debris, oils, and/or other contaminates from entering the interior of the enclosure 112. The collar 114 may define a key opening 115. The key opening 115 may be configured to receive at least a portion of a tactile switch element, such as the tactile switch described below, to facilitate actuation of the key assembly 108. The key opening 115 may also allow light to pass from the key assembly 108 toward the key cap 110 to illuminate or display the illuminable symbol 111. It should be appreciated that the collar 114 is optional and may be omitted.

The key assembly 108 may include a support structure 120. The support structure 120 functions as a moveable hinge that allows the key cap 110 to move in response to a force input. For example, the support structure 120 may be configured to support the key cap 110 within the enclosure 112 and guide movement of the key cap 110 during a user actuation or switch event. The support structure 120 may include wings 122a, 122b, which are separate components coupled together by hinge 124. For example, the wings 122a, 122b may be a pair of wings that are defined by a first wing 122a and a second wing 122b, as described herein. The hinge 124 may be formed from a compliant material that allows the wings 122a, 122b to pivot relative to one another. As described herein, the wings 122a, 122b may be formed or molded over the compliant material of the hinge 124. Wings 122a, 122b may each include a cutout such that when wings 122a, 122b are coupled together, cavity 123 exists. As such, the hinge 124 may be one of a set of hinges operable to pivotally couple the wings 122a, 122b on opposing sides of the cavity 123. Cavity 123 may have any suitable shape such as, for example, a square, rectangle, circle, ellipse, and so on. The wings 122a, 122b can extend outward from the hinge 124 in different or opposing directions, much like the wings of a butterfly. Wings 122a, 122b can be positioned such that there's an oblique angle between them when the key cap 110 is in a rest state (e.g., no exerted force on key cap 110). Wings 122a, 122b can flatten to be substantially planar when the key cap 110 is fully depressed.

The support structure 120 may be supported within the key assembly 108 by a switch housing 128. The switch housing 128 may be at least partially positioned within the cavity 123 (e.g., surrounded and/or within the wings 122a, 122b of the support structure 120) and pivotally coupled to the support structure 120. For example, and as described in greater detail below with respect to FIG. 2B, the support structure 120 may include various pins, protrusions, or other engagement features that are received by corresponding retention features, tracks, or other structures of the switch housing 128. The switch housing 128 may be constructed from any appropriate material, including a moldable or curable material, as may be appropriate for a given application. In some cases, the switch housing 128 may be at least partially transparent (e.g., including a transparent region extending through a thickness of the switch housing 128) such that light from within the key assembly 108 may travel through the switch housing 128 and toward the key cap 110 to illuminate the illuminable symbol 111. The switch housing 128 may define a switch opening 130. The switch opening 130 may be configured to receive, and at least partially surround, a tactile switch element, such as a tactile dome.

As shown in FIG. 2A, the key assembly 108 may be actuated by a tactile dome 132. For example, the tactile dome 132 may be a component of a tactile switch that triggers a switch event in response to the tactile dome 132 collapsing. Such collapse may be caused by a depression of the key cap 110. The tactile dome 132 may be formed from any appropriate material (e.g., including metal, rubber, silicon, plastic, or the like) that exhibits sufficiently elastic and/or resilient characteristics. For example, the tactile dome 132 may be sufficiently elastic or resilient such that it does not permanently deform from an applied force (e.g., the tactile dome 132 may substantially return to an original or undeformed shape after the force ceases). In this regard, depressing the key cap 110 may be collapse the tactile dome 132, which in turn may trigger a switch event, as described below. Further, the tactile dome 132 may return to an undeformed shape when the key cap 110 returns to a neutral or undepressed condition. The tactile dome 132 may not be limited to the above example materials, and may also include other appropriate materials consistent with the various embodiments presented herein. In some cases, the tactile dome 132 may be a transparent or partially transparent structure that allows light to pass through the tactile dome 132 and toward the key cap 110 to illuminate the illuminable symbol 111.

The tactile dome 132 may be positioned on or otherwise connect to a sensing membrane 136, for example, such that the sensing membrane 136 extends below an underside of the tactile dome 132. The sensing membrane 136, described in greater detail below with respect to FIGS. 6A-6D, may be used to initiate an input signal in response to depression of the key cap 110. In this regard, the tactile dome 132 and the sensing membrane 136 jointly may form a tactile switch and trigger a switch event upon the depression of the key cap 110. As one example, the tactile dome 132 may be a substantially non-conductive dome that causes electrical contacts of the sensing membrane 136 to contact one another and trigger a switch event when the tactile dome 132 collapses. Additionally or alternately, the tactile dome 132 may include an electrically conductive puck, strip, protrusion, or other electrical component that is used to complete a circuit or close a switch on the sensing membrane 136 when the tactile dome 132 collapses. Additionally, the sensing membrane 136 may define a series of membrane openings 138 that may allow light to propagate through the key assembly 108 and/or receive a structural component of the key assembly 108, for example, such as an engagement structure of a feature plate.

In this regard, the key assembly 108 may include a feature plate 142. The feature plate 142 may be positioned within the key assembly 108 proximate to an underside of the sensing membrane 136. The feature plate 142 may be a structural portion of the key assembly 108 and may secure the switch housing 128 within the key assembly 108. For example, the feature plate 142 may include, define, or be coupled with various support structures, engagement features, or the like that are configured to extend through one or more of the series of membrane openings 138 and engage a surface or feature of the switch housing 128. In the embodiment of FIG. 2A, feature plate 142 includes engagement structures 144 that may extend through the series of membrane openings 138 and engage an underside of the switch housing 128.

To facilitate the foregoing, the feature plate 142 may be constructed from any suitable electrically conductive sheet metal, including, but not limited to: aluminum, steel, stainless steel, metal alloys, and so on. Additionally or alternatively, other materials and constructions of the feature plate 142 are contemplated, including embodiments in which the feature plate 142 is constructed from an electrically insulating material, a ceramic, or the like. In some cases, for example, as described with respect to FIGS. 8A and 8B, the engagement structure 144 may be cut, stamped, and/or bent from the sheet metal, plastic, or other appropriate component, which may enhance the manufacturability of the key assembly 108. The feature plate 142 may also include a series of feature plate openings 146. The series of feature plate openings 146 may be used to allow light from within the key assembly 108 to propagate through the feature plate 142 and toward the key cap 110 to illuminate the illuminable symbol 111. In the embodiment shown in FIG. 2A, the feature plate 142 may also define a relief 148. The relief 148 may be positioned below the tactile dome 132 in the key assembly 108 and be configured to receive a portion of the sensing membrane 136 during a key press. For example, and as described in greater detail below with respect to FIGS. 6A and 6B, the sensing membrane 136 may be configured to deform into the relief 148 when the tactile dome collapses, which may help provide a desired tactile effect at the key cap 110.

The key assembly 108 may be configured to illuminate the illuminable symbol 111. For example, as shown in FIG. 2A, the key assembly 108 may include a light guide panel (LGP) 150. The LGP 150 may be a translucent or transparent layer that is used to direct or channel light through the enclosure 112 described with respect to FIG. 1. For example, the LGP 150 may be optically coupled with a light source, such as an LED or other light emitting element, along a periphery of the enclosure 112. The LGP 150 redirects light from the light source and toward the key assembly 108, which may cause the illuminable symbol 111 to illuminate. To facilitate the foregoing, the LGP 150 may define or be coupled with a light extraction feature 154 that is configured to expel light from the LGP 150 and direct the expelled light toward the key cap 110. The light extraction feature 154 may be a textured surface, a lens, an aperture, and/or any other region of the LGP 150 that is configured to propagate light toward the key cap 110. As described in greater detail below with respect to FIGS. 7A-7C, the light extraction feature 154 may be configured to exhibit an optical characteristic (e.g., light path, brightness, contrast, interference pattern, and so on) that corresponds to the illuminable symbol 111. This may allow the key assembly 108 to maximally or optimally illuminate the illuminable symbol 111 according to a predetermined optical effect (e.g., which may be used to enhance the brightness of the illuminable symbol 111.

Figure 2B:
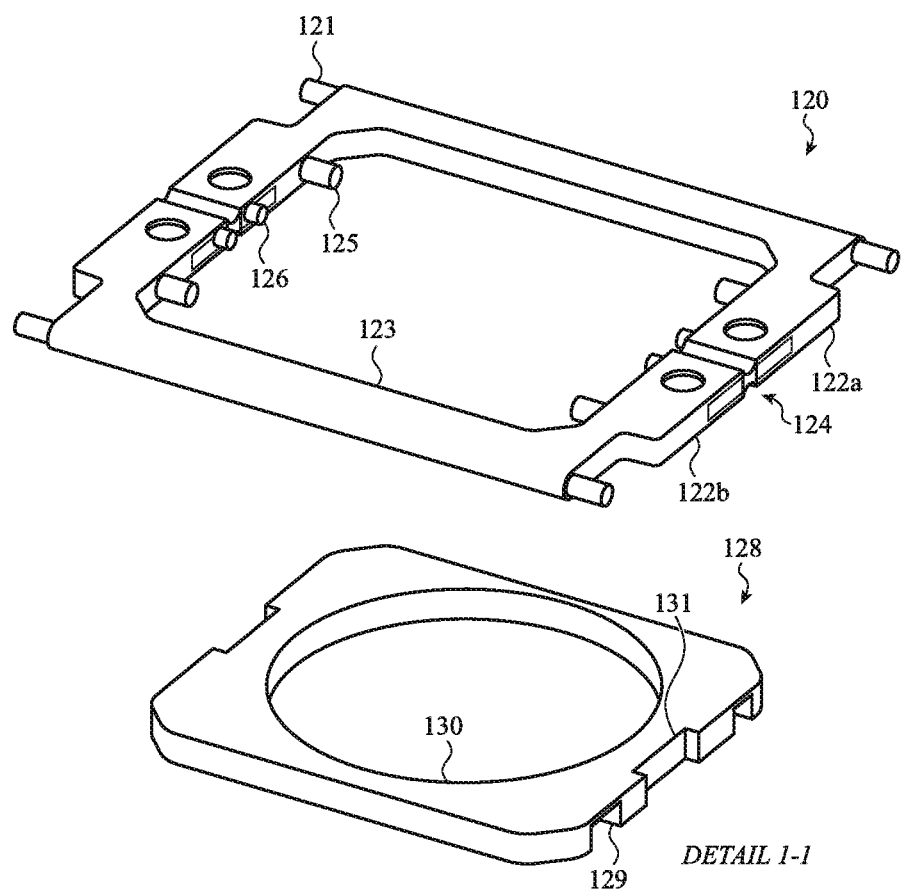
FIG. 2B depicts the support structure mechanism and the switch housing of FIG. 2A.

FIG. 2B depicts detail 1-1 of the support structure 120 and the switch housing 128 of FIG. 2A. As shown in the non-limiting example of FIG. 2B, the support structure 120 includes wings 122a, 122b, which are shown pivotally coupled about the hinge 124. The wings 122a, 122b may be overmolded components that are formed over, and extend from, opposing ends of the hinge 124. The hinge 124 may be formed from a compliant material. The wings 122a, 122b may pivot and/or move generally relative to one another about the hinge 124. For example, the hinge 124 may elastically deform in response to movements of the wings 122a, 122b, which may allow the wings 122a, 122b to move during depression of a key cap (e.g., key cap 110 of FIG. 2A). In the embodiment of FIG. 2B, the wings 122a, 122b are shown in substantially flattened or planar configuration, for example, which may result when the key cap 110 is depressed. As described herein, when a force or key press exerted on the key cap 110 ceases, the wings 122a, 122b may be positioned such that there is an oblique angle between them, thereby resembling the wings of a butterfly.

The wings 122a, 122b may include various protrusions, pins, or other features that extend from the wings 122a, 122b and engage corresponding features of the key assembly 108. As shown in FIG. 2B, the support structure 120 may include key cap engagement structures 121. The key cap engagement structures 121 may extend from the wings 122a, 122b and be configured to engage an underside of the key cap 110. The key cap engagement structures 121 may be cantilevered structures that extend from the wings 122a, 122b and away from the cavity 123 (e.g., along an outer edge or outer surface of the wings 122a, 122b). As such, the key cap 110 may be positioned along the support structure 120 and receive or couple with the key cap engagement structures 121 around a periphery of the support structure 120. This may help stabilize movement of the key cap 110 during actuation.

The support structure 120 may also include protrusions 125. The protrusions 125 may extend from the wings 122a, 122b and into the cavity 123. The protrusions 125 may be configured to engage the switch housing 128 to secure the support structure 120 within the key assembly 108. For example, the protrusions 125 may be cantilevered structures that extend from the wings 122a, 122b into the cavity 123. As such, the protrusions 125 may be used to pivotally couple the support structure 120 to the switch housing 128. As explained in greater detail below, the protrusions 125 may be received by a retention feature, hole, recess, or the like of the switch housing 128 and rotate or translate therein during depression of the key cap 110. This may support movement of the key cap 110 and allow the support structure 120 to pivot as the key cap 110 advances downward.

The support structure 120 may also include upstop features 126. The upstop features 126 may extend from the wings 122a, 122b and be configured to limit upward expansion of the key cap 110 when the application of force on the key cap 110 ceases. The upstop features 126 may be cantilevered structures that extend from the wings 122a, 122b into the cavity 123. As explained in greater detail below, the upstop features 126 may be received by a track or other feature of the switch housing 128 that provides or defines a physical barrier to limit or restrict the movement of the upstop features 126, which may, in turn, limit the upward expansion of the key cap 110.

The switch housing 128 may be configured to fit or otherwise be positioned within the cavity 123. In this manner, the switch housing 128 may be surrounded by the support structure 120. The switch housing 128 may be surrounded by the support structure 120 in a manner that allows the support structure 120 to pivotally connect and couple with the switch housing 128. For example, the switch housing 128 may define retention features 129 defined along an outer surface of the switch housing 128. The retention features 129 may be openings, holes, recesses, or the like that are configured to receive corresponding ones of the protrusions 125 of the support structure 120. Depression of the key cap 110 may cause the protrusions 125 to rotate within the retention features 129 as the wings 122a, 122b of the support structure 120 transition from a v-shaped structure to a substantially flattened structure. In some cases, as described in greater detail below with respect to FIGS. 5A-5C, one or more of the retention features 129 may be an elongated feature that allows a corresponding one of the protrusions 125 to translate with the retention feature 129 during depression of the key cap 110.

The switch housing 128 may also include various features and structures that cooperate with the support structure 120 to limit the upward expansion of the key cap 110 when a force input exerted on the key cap 110 by a user ceases. As shown in the embodiment of FIG. 2B, the switch housing 128 may define an upstop track 131. The upstop track 131 may be configured to receive the upstop features 126 of the support structure 120. The upstop track 131 may provide a physical barrier that limits or restricts movement of the upstop features 126, which may, in turn, limit the upward expansion of the key cap 110. In this regard, the upstop track 131 may limit the upward expansion of the key cap 110 by blocking or inhibiting movement of the upstop feature 126 beyond a predetermined position.

Figure 3:
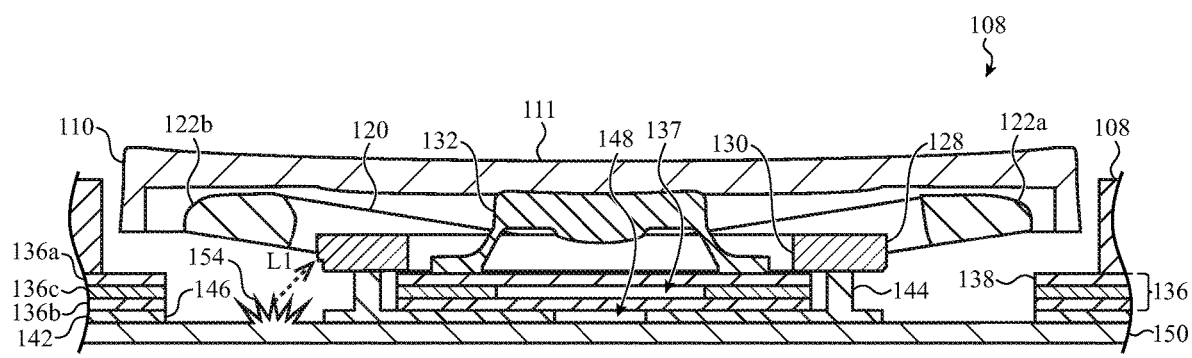
FIG. 3 depicts a cross-sectional view of the key assembly of FIG. 1, taken along line A-A of FIG. 1.

FIG. 3 is a cross-sectional view of the key assembly 108 of FIG. 1, taken along line A-A of FIG. 1. As illustrated, the key cap 110 is shown defining an input surface of the key assembly 108, which may be similar to other possible input surfaces, such as mouse buttons, trackpads, joystick buttons, standalone buttons, and so on. The key cap 110 is supported within the key assembly 108 by the support structure 120. As shown in FIG. 3, the key cap 110 is in an unactuated position. In this regard, the support structure 120 may resemble a v-shaped structure that supports the key cap 110 above the switch housing 128 and tactile switch elements of the key assembly 108, such as tactile dome 132. In an actuated configuration, the key cap 110 may press down onto the tactile dome 132 such that the tactile dome 132 collapses or buckles, which may cause the key assembly 108 to trigger a switch event. The downward motion of the key cap 110 may be guided by the support structure 120, which may temporarily flatten as the key cap 110 is depressed, for example, as shown and described with respect to FIGS. 5B and 5C. When an input force on the key cap 110 ceases, the key cap 110 may return to the unactuated position. To facilitate the foregoing, the tactile dome 132 may be configured to bias the key cap 110 upward. This may also help deliver a desired tactile effect to the key cap 110.

The tactile dome 132 may be positioned within the switch opening 130 defined by the switch housing 128 and along the sensing membrane 136. The sensing membrane 136 may include various electrical contacts that are used to trigger a switch event in response to the collapsing of the tactile dome 132 caused by a depression of the key cap 110. In the embodiment of FIG. 3, the sensing membrane 136 may be a multi-layered structure that includes electrical contacts (not shown in FIG. 3) separated by a gap. Collapsing of the tactile dome 132 closes the gap between the electrical contacts and causes the sensing membrane 136 to trigger a switch event.

The sensing membrane 136 includes, in a particular embodiment, first and second deformable layers 136a, 136b. The first and second deformable layers 136a, 136b are separated within the sensing membrane 136 by a spacer 136c. The spacer 136c may include an opening that defines a cavity 137 between the first and second deformable layers 136a, 136b. The first and second deformable layers 136a, 136b may include electrical contacts of the sensing membrane 136 positioned within the cavity 137 (e.g., on opposing sides or top and bottom portions of the cavity 137, respectively). As shown and described in greater detail with respect to FIGS. 6A and 6B, when the tactile dome 132 collapses, the cavity 137 may be pinched such that the electrical contacts of the sensing membrane 136 contact and trigger a switch event. In this regard, the tactile dome 132 need not include any electrically conductive components in order for the sensing membrane 136 to trigger a switch event. It will be appreciated, however, that in other configurations, for example, such as that described with respect to FIGS. 6C and 6D, the tactile dome 132 may include an electrically conductive puck or other structure that may be used to complete a switch defined on and/or in the sensing membrane 136.

The sensing membrane 136 may be positioned above the feature plate 142. As shown in FIG. 3, the feature plate 142 may include the relief 148. The relief 148 may be a hole or other through feature extending partially or fully through the feature plate 142. The relief 148 may be positioned below the cavity 137 of the sensing membrane 136 and below the tactile dome 132. As such, the relief 148 may be configured to receive a portion of the sensing membrane 136 when the tactile dome 132 collapses. For example, the tactile dome 132 may pinch the first and second deformable layers 136a, 136b toward one another and cause the first and second deformable layers 136a, 136b to at least partially extend or bend into the relief 148. This may help deliver a sensation of a longer key stroke, as the relief 148 allows the tactile dome 132 to extend further downward into the key assembly 108 during depression of the key cap 110.

The feature plate 142 provides structural support to the switch housing 128 within the key assembly 108. In one embodiment, the engagement structures 144 of the feature plate 142 may extend from a top surface of the feature plate 142 and couple with an underside of the switch housing 128. For example, the engagement structures 144 may extend through corresponding ones of the series of feature plate openings 146 and corresponding ones of the series of membrane openings 138 and engage the switch housing 128. In some cases, the engagement structures 144 may include barbs or other projections or protrusion features that are inserted into the underside surface of the switch housing 128. Additionally or alternatively, the engagement structures 144 may include holes or other through portions that may receive a portion of the switch housing 128 or other coupling structure to secure the switch housing 128 within the key assembly 108 using the feature plate 142.

The LGP 150 may be arranged within the key assembly 108 along an underside of the feature plate 142. The LGP 150 may include the light extraction feature 154. The light extraction feature 154 may be used to expel light from the LGP 150 and direct the expelled light toward the key cap 110 in order to illuminate the illuminable symbol 111. As shown in FIG. 3, the light extraction feature 154 may direct light along light path L1. It will be appreciated that light path L1, and all light paths described herein (e.g., light paths L2, L3, L4 of FIGS. 7A-7C), are depicted for purposes of illustration only. Rather than suggest that light expelled from the LGP 150 travels exclusively along a particular light path, the illustrated light paths are depicted to be a representation of diffuse light that propagates within the key assembly 108. Notwithstanding the foregoing, light path L1 may correspond to a contour, shape, area, or other attribute of the illuminable symbol 111. For example, and as described in greater detail with respect to FIGS. 7A-7C, the light extraction feature 154 may be configured to exhibit an optical characteristic or otherwise direct light in a manner that illuminates the illuminable symbol 111 according to a predetermined optical effect, such as illuminating the illuminable symbol 111 in a manner that maximizes light emitted from the key cap 110.

Figure 4A:
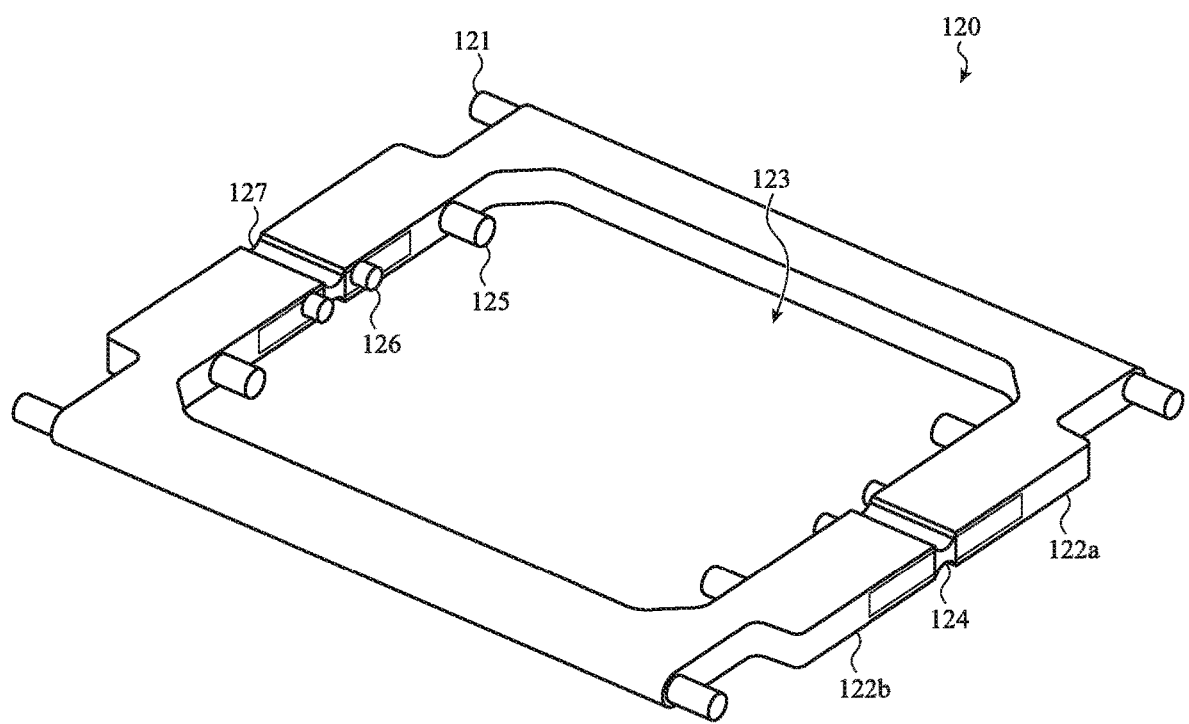
FIG. 4A depicts an embodiment of a sample support structure mechanism.
Figure 4B:
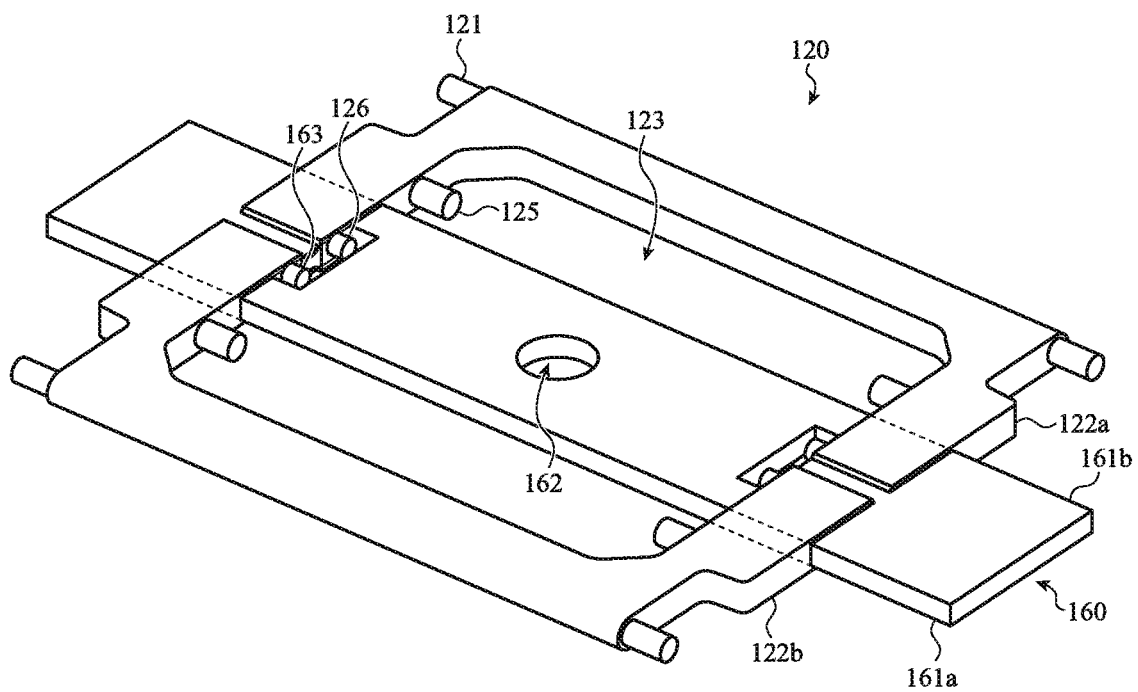
FIG. 4B depicts the sample support structure mechanism of FIG. 4A molded over a compliant strip.
Figure 4C:
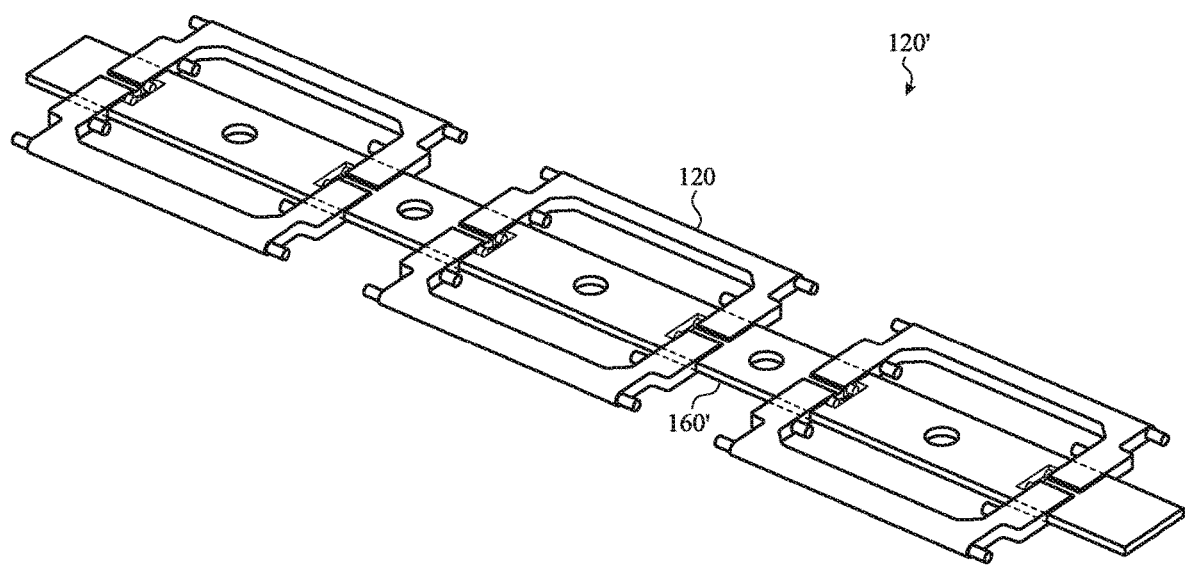
FIG. 4C depicts multiple sample support structure mechanisms molded over a compliant strip.

FIGS. 4A-4C depict the support structure 120 described with respect to FIGS. 2A and 2B. In particular, FIGS. 4A-4C depict the support structure 120 in various stages of formation during a process of manufacturing the support structure 120.

The wings 122a, 122b may be overmolded structures that are molded over the hinge 124. For example, the wings 122a, 122b may be a pair of wings that are constructed or formed from a compliant and moldable material that is introduced into a form resembling a desired shape of the wings 122a, 122b. For example, the form may define a shape of the wings 122a, 122b, including the cavity 123 arranged between the wings 122a, 122b, the key cap engagement structures 121, the protrusions 125, the upstop features 126, and/or any other geometries or features of the wings 122a, 122b. A strip of the compliant material may be placed within the form and used to construct the hinge 124. In this regard, when introduced or flowed into the form, the moldable material of the wings 122a, 122b may be molded over the compliant material to form the overmolded hinge 124 of FIG. 4A.

The compliant material used to form the hinge 124 may be a substantially heat-resistant material that inhibits physical or chemical changes of the hinge 124 when the moldable material is introduced and molded over the hinge 124. As such, the moldable material may be subsequently cured or hardened, including through various mechanical and chemical techniques, to form the wings 122a, 122b. This may cause the wings 122a, 122b to exhibit a rigidity greater than that of the hinge 124, while maintaining the compliant or elastically deformable nature of the hinge 124 during the overmolding of the wings 122a, 122b.

As shown in FIG. 4A, the hinge 124 may be positioned within each of the wings 122a, 122b. For example, the wings 122a, 122b may be molded over both a top and a bottom surface of the hinge 124 such that the hinge 124 is sandwiched within each of the wings 122a, 122b. A region of the hinge 124 may also separate the wings 122a, 122b. For example, joint 127 may be a portion of the hinge 124 that separates the wings 122a, 122b. The joint 127 may deform, expand, contract, or the like in order to allow the wings 122a, 122b to pivot and/or move generally relative to one another. The joint 127 may be formed by molding the wings 122a, 122b over opposing ends of the hinge 124. In this manner, the hinge 124 may extend into each of the wings 122a, 122b by a predetermined amount, which may help securely bond the wings 122a, 122b to the hinge 124. As shown in FIG. 4A, the hinge 124 may extend into the wings 122a, 122b beyond the upstop features 126; however, other configurations are contemplated within the scope of the present disclosure.

With reference to FIG. 4B, the support structure 120 is shown in a state of manufacture in which the wings 122a, 122b are molded over a strip of compliant material 160. The strip of compliant material 160 may be used to form the hinge 124 described herein. For example, the strip of compliant material 160 may be advanced through and extend across a form. Moldable material may be introduced into the form and molded over opposing edges of the strip of compliant material 160 to form the wings 122a, 122b. For example, this may cause, as shown in FIG. 4B, the first wing 122a to be formed and molded over a first edge 161a of the strip of compliant material 160 and the second wings 122b to be formed and molded over a second edge 161b of the strip of compliant material 160.

The strip of compliant material 160 may include various holes, recesses, openings, or other features that may facilitate the manufacture of the support structure 120. For example, the strip of compliant material 160 may include alignment hole 162. The alignment hole 162 may be a through portion of the strip of compliant material 160 that may be used to advance the strip of compliant material 160 into and through the form and align the strip of compliant material 160 therein for adequate molding of the wings 122a, 122b. In some cases, the alignment hole 162 may be configured to receive a mechanical feature or component of a manufacturing process that may advance the strip of compliant material 160 using the alignment hole 162. The strip of compliant material 160 may also include voids 163. The voids 163 may be through portions of the strip of compliant material 160 that may allow protrusions, pins, projections, or other features of the wings 122a, 122b to extend into a region defined by the strip of compliant material 160. As shown in FIG. 4B, the upstop feature 126 may extend into respective ones of the voids 163. This may allow the hinge 124 to extend into the wings 122a, 122b beyond the upstop features 126, while having the up stop features 126 extend into a region of the cavity 123 defined by the strip of compliant material 160.

As shown in FIG. 4B, the strip of compliant material 160 may extend through the wings 122a, 122b and across the cavity 123. Subsequent to the molding of the wings 122a, 122b over the strip of compliant material 160, excess portions of the strip of compliant material 160 may be removed to reveal the hinge 124 described with respect to FIG. 4A. For example, the portion of the strip of compliant material positioned within the cavity 123 and the portion extending away from the wings 122a, 122b, opposite the cavity 123, may be removed or detached from the wings 122a, 122b to reveal the hinge 124.

With reference to FIG. 4C, a set of support structures 120' is shown in a state of manufacture in which multiple discrete support structures, such as support structure 120 described with respect to FIGS. 4A and 4B, may be formed using a single continuous strip of compliant material. In particular, each of the set of support structures 120' may be molded and formed over the strip of compliant material 160'. Excess portions of the strip of compliant material 160' may be separated from the set of support structures 120' to reveal individual support structures. This may allow multiple support structures to be constructed in rapid succession, thereby improving manufacturability of the various support structures described herein.

Figure 5A:
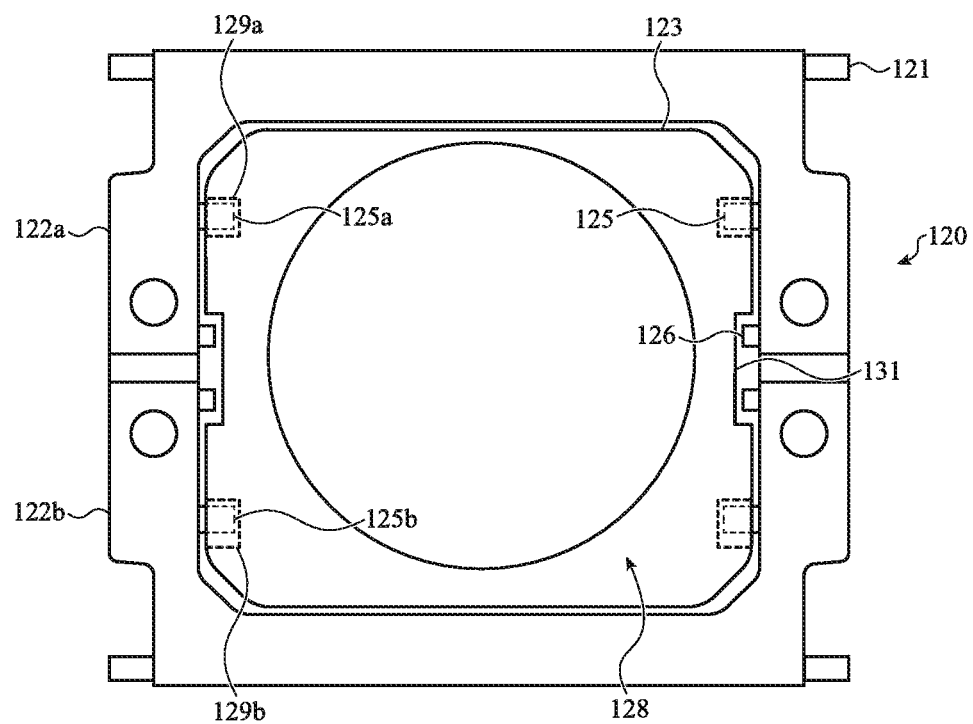
FIG. 5A depicts a top view of a sample support structure mechanism and switch housing.
Figure 5B:
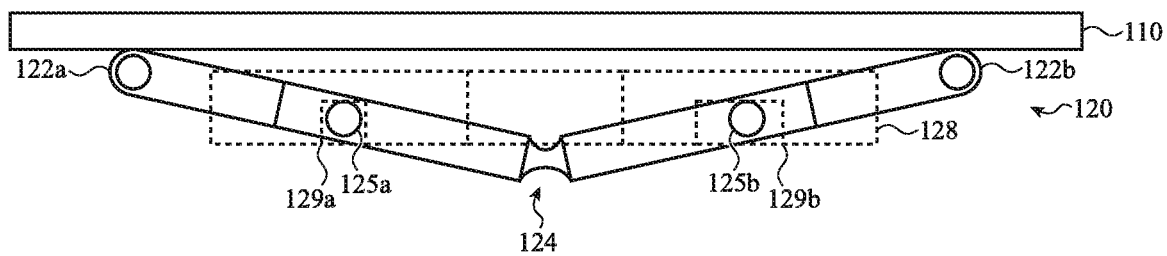
FIG. 5B depicts a side view of the sample support structure mechanism of FIG. 5A in an unactuated state.
Figure 5C:
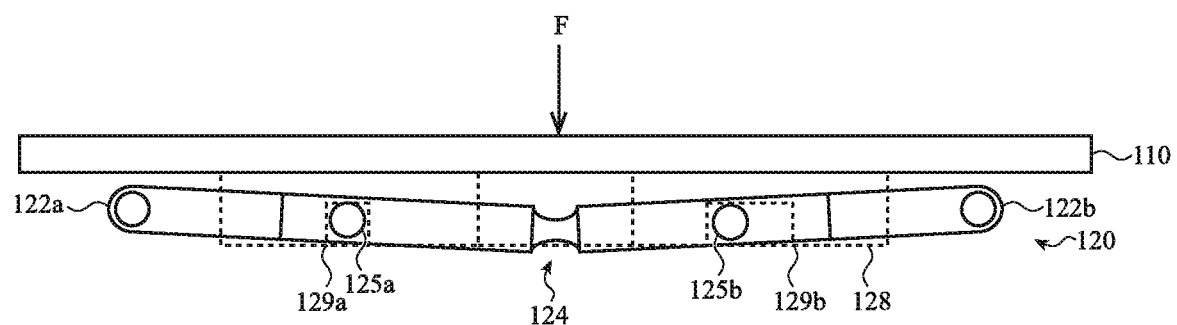
FIG. 5C depicts a side view of the sample support structure mechanism of FIG. 5A in an actuated state.

FIGS. 5A-5C depict the support structure 120 and the switch housing 128 described with respect to FIGS. 2A and 2B. In particular, FIGS. 5A-5C depict the engagement of the support structure 120 and the switch housing 128.

With reference to FIG. 5A, a top view of the support structure 120 and the switch housing 128 is shown. The switch housing 128 is shown positioned within the cavity 123 defined by the wings 122a, 122b of the support structure 120. The support structure 120 is shown engaged with the switch housing 128. For example, the protrusions 125 may extend into the cavity 123 and be received by recesses, holes, openings, and/or other retention features of the switch housing 128. As such, the support structure 120 may be secured within the key assembly 108 by the switch housing 128. The protrusions 125 may also allow the support structure 120 to pivot relative to the switch housing 128.

The switch housing 128 may include or be coupled with various different sizes, shapes, and configurations of retention features in order to support various types of movements of the support structure 120 within the key assembly 108. For example, the retention features may have a size and/or shape that allows for a predetermined amount and direction of movement of the protrusions 125 when a key cap (e.g., key cap 110 of FIG. 1) is depressed. This may help determine the keystroke of the key cap 110 and deliver a desired tactile response in response to a key press or other force input.

In the embodiment of FIG. 5A, the switch housing 128 may include a first retention feature 129a and a second retention feature 129b. The first and second retention features 129a, 129b may be recesses, grooves, or openings formed along a common exterior surface of the switch housing 128. Protrusions 125 of the support structure 120 may be received by corresponding ones of the first and second retention features 129a, 129b. For example, a first protrusion 125a of the protrusions 125 may extend from the first wing 122a and may be received by the first retention feature 129a, and a second protrusion 125b of the protrusions 125 may extend from the second wing 122b and may be received by the second retention feature 129b.

The first retention feature 129a may be defined by a shape that substantially conforms or matches a shape of the protrusions 125. For example, the first retention feature 129a may have a cross-dimension or width that is substantially similar to (or slightly larger than) a cross-dimension or width of the protrusions 125. In contrast, the second retention feature 129b may be an elongated structure that may have a cross-dimension or width that is greater than a cross-dimension or width of the protrusions 125. Accordingly, the first and second retention features 129a, 129b may constrain movement of the protrusions 125 in a distinct manner during depression of the key cap 110. For example, when the key cap 110 is depressed, the first protrusion 125a may rotate within the first retention feature 129a, and the second protrusion 125b may rotate and translate within the second retention feature 129b, as depicted and described with respect to FIGS. 5B and 5C.

With reference to FIG. 5B, the key cap 110 is shown in an unactuated position. The key cap 110 is supported above the switch housing 128 by the support structure 120. The support structure 120 may be pivotally coupled to the key cap 110 and the switch housing 128 and guide movement of the key cap 110 as it is depressed toward the switch housing 128. To facilitate the foregoing, the key cap engagement structure 121 may be pivotally coupled to an underside of the key cap 110. Further, the protrusions 125 may be pivotally coupled with the switch housing 128. Accordingly, as the key cap 110 is depressed, the wings 122a, 122b may pivot relative to the key cap 110 at the key cap engagement structures 121, and the wings 122a, 122b may pivot relative to the switch housing 128, for example, at the first and second retention features 129a, 129b, described herein.

As shown in FIG. 5B, the first retention feature 129a may have a substantially similar width as that of the first protrusion 125a, whereas the second retention feature 129b may have an elongated width that is larger than that of the second protrusion 125b. As such, the first retention feature 129a may be configured to constrain lateral or translational movement (e.g., movement along a direction extending across the first and second wings 122a, 122b) of the first protrusion 125a during depression of the key cap 110, whereas the second retention feature 129b may be configured to allow lateral or translational movement of the second protrusion 129b during depression of the key cap 110. For example, the second protrusion 125b may slide laterally within the second retention feature 129b when the key cap 110 is depressed. In the unactuated position, the support structure 120 may resemble a v-shaped structure. As such, the second protrusion 125b may be positioned along a rightmost side of the second retention feature 129b when the key cap 110 is in the unactuated position.

With reference to FIG. 5C, the key cap 110 is shown in an actuated position. The key cap 110 may arrive in the actuated position in response to a force input F acting on the key cap 110. When the key cap 110 is depressed, the key cap 110 may exert a force on the support structure 120 that causes the wings 122a, 122b to pivot relative to the key cap 110. In turn, the support structure 120 may transition from resembling a substantially v-shaped structure to a substantially flattened structure as the key cap 110 is pressed down onto the support structure 120. The key cap 110 may impact a tactile dome (not shown in FIG. 5C), and trigger a switch event.

The support structure 120 may also pivot and move relative to the switch housing 128 during the depression of the key cap 110. For example, depression of the key cap 110 may cause the first protrusion 125a to rotate within the first retention feature 129a and the second protrusion 125b to rotate within the second retention feature 129b. The second protrusion 125b may also translate or slide within the second retention feature 129b when the key cap 110 is depressed. For example, as shown in FIG. 5C, the second protrusion 125b may slide from a right most portion of the retention feature 129b to a left most portion of the retention feature 129b.

The pivoting action of the support structure 120 may be facilitated by the hinge 124. As described above, the hinge 124 may be formed from or include a compliant material layer over which the wings 122a, 122b are molded over. As such, the hinge 124 may deform, bend, expand, contract, or the like as may be required to support the pivoting of the support structure 120 relative to the key cap 110 and the switch housing 128, as described herein. In a particular embodiment, as shown in FIG. 5C, the hinge 124 may move up toward the key cap 110 as the key cap 110 is depressed. The hinge 124 may also at least locally be contracted or compressed as the wings 122a, 122b move momentarily closer to one another as the key cap 110 is depressed. This may improve the z-profile or keystroke of the support structure 120 and deliver a desired tactile sensation to the key cap 110 during a key press.

FIGS. 6A-6D depict various embodiments of the sensing membrane 136. The sensing membrane 136, as described herein, may be used to trigger a switch event in response to the collapsing of the tactile dome 132. As described above, the sensing membrane 136 and the tactile dome 132 may cooperate to form a tactile switch. The sensing membrane 136 may include and/or be coupled with various different electrical components, including various different electrical contacts, switches, electrical traces, or the like. In some cases, the sensing membrane 136 may also include one or more elements of a capacitive-based sensor, magnetic-based sensor, optical sensor, and/or other sensor that may be used to trigger a switch event when the tactile dome 132 collapses.

Figure 6A:
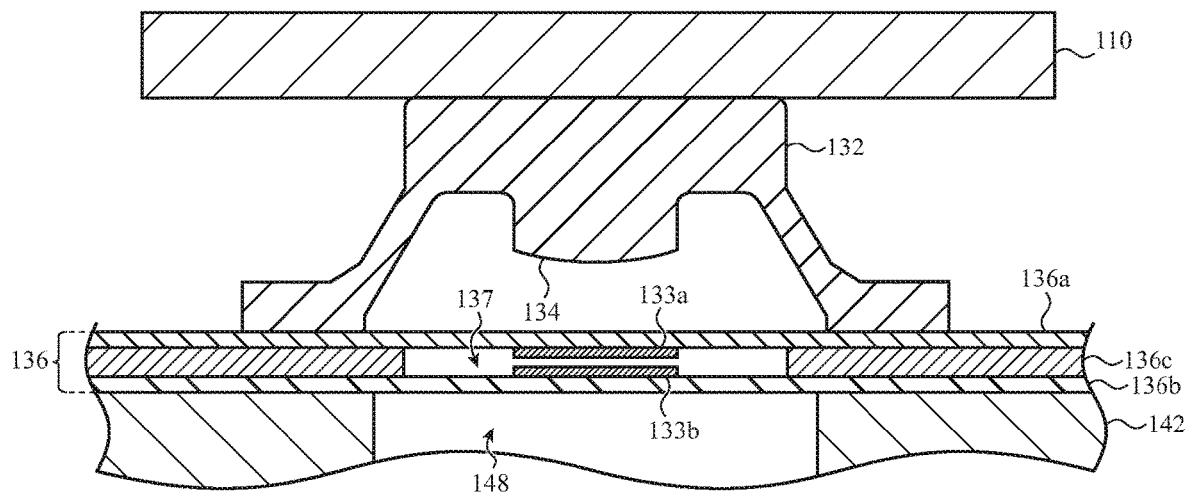
FIG. 6A depicts a sample tactile dome and a sensing membrane in an unactuated state.

With reference to FIG. 6A, the key cap 110 is shown in an unactuated configuration and positioned above the tactile dome 132 and the sensing membrane 136. As described with respect to FIG. 3, in one embodiment, the sensing membrane 136 may include first and second deformable layers 136a, 136b, and a spacer 136c. The first and second deformable layers 136a, 136b may be separated within the sensing membrane 136 by the spacer 136c. The spacer 136c may include an opening that defines the cavity 137 between the first and second deformable layers 136a, 136b. In the embodiment of FIG. 6A, the sensing membrane 136 may include first and second electrical contacts 133a, 133b. The first and second electrical contacts 133a, 133b may be electrically conductive contact elements of a contact based switch. The first electrical contact 133a may be attached or included within the first deformable layer 136a and the second electrical contact 133b may be attached or included within the second deformable layer 136b. The first and second electrical contacts 133a, 133b may be positioned within the cavity 137 and separated by a gap.

Positioned above the sensing membrane 136 is the tactile dome 132. The tactile dome 132 may include a contact feature 134 that extends from an underside surface of the tactile dome 132. The contact feature 134 may be positioned or aligned within the cavity 137 and the first and second electrical contacts 133a, 133b contained therein. In this regard, the contact feature 134 may be configured to strike or contact the sensing membrane 136 at a region defined by the cavity 137. The sensing membrane 136 is shown positioned over the feature plate 142. As described herein, the feature plate may include the relief 148. The relief 148 may be positioned below the region of the sensing membrane 136 defined by the cavity 137. The relief 148 may also be positioned below and substantially aligned with the contact feature 134.

Figure 6B:
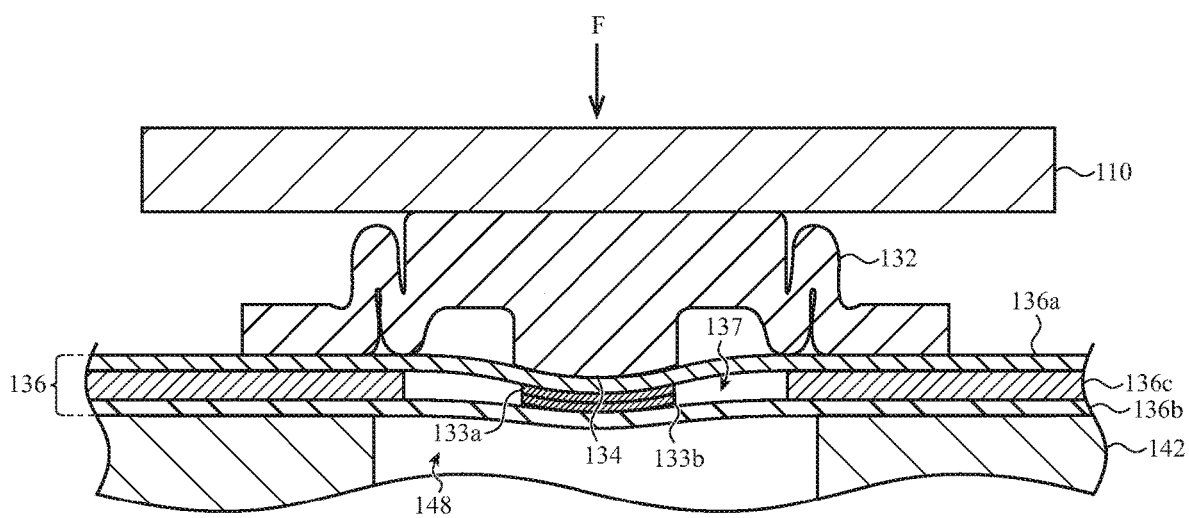
FIG. 6B depicts a sample tactile dome and a sensing membrane in an actuated state.

With reference to FIG. 6B, the key cap 110 is shown in an actuated configuration. In the actuated configuration, the key cap 110 presses down onto the tactile dome 132 in response to an external force F exerted on the key cap 110. The downward motion of the key cap 110 may cause the tactile dome 132 to collapse or buckle, for example, as shown in FIG. 6B. In a buckled state, the contact feature 134 of the tactile dome 132 may contact the sensing membrane 136. In particular, the contact feature 134 may exert a force on the sensing membrane 136 that causes the first and second deformable layers 136a, 136b to be pinched or squeezed such that the first and second deformable layers 136a, 136b move toward one another and contact. Movement of the first and second deformable layers 136a, 136b may cause the first and second electrical contacts 133a, 133b to contact one another and trigger a switch event. As shown in FIG. 6B, the first and second deformable layers 136a, 136b are pinched by the action of the contact feature 134, and at least a portion of the sensing membrane 136 may extend into the relief 148.

Figure 6C:
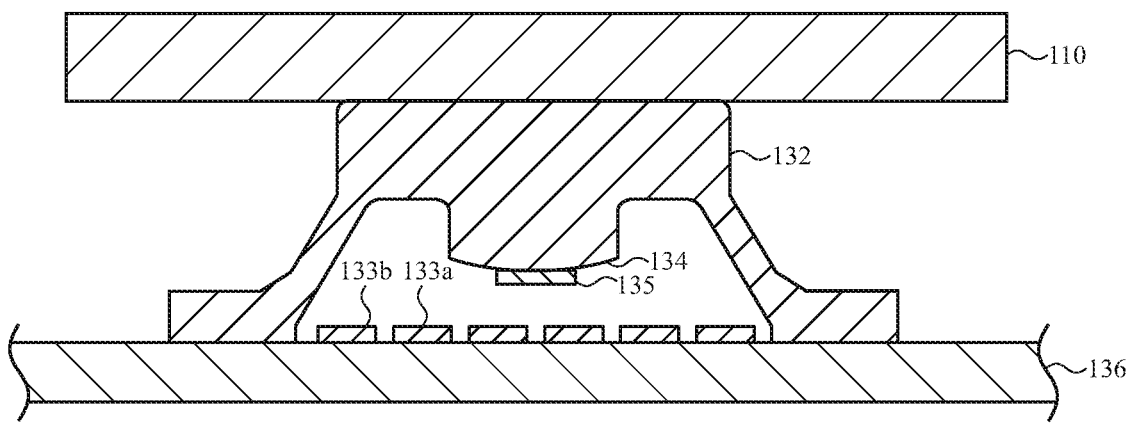
FIG. 6C depicts another embodiment of a sample tactile dome and a sensing membrane in an unactuated state.

With reference to FIG. 6C, the key cap 110 is shown in an unactuated configuration and positioned over the tactile dome 132 and the sensing membrane 136, according to another configuration. In the configuration of FIG. 6C, the tactile dome 132 may include an electrically conductive puck 135. The electrically conductive puck 135 may be positioned along the contact feature 134. The electrically conductive puck 135 may be used to complete a circuit or close a switch defined on or along the sensing membrane 136. For example, in the embodiment of FIG. 6C, the first and second electrical contacts 133a, 133b may be a set of alternating comb-like structures (depicted with respect to FIG. 6D) that are separated from one another along an exterior or top surface of the sensing membrane 136. When the key cap 110 presses down into the tactile dome 132, the tactile dome 132 may collapse or buckle and cause the electrically conductive puck 135 to contact the first and second electrical contacts 133a, 133b, thereby triggering a switch event. In particular, the electrically conductive puck 135 may extend across a separation between the first and second electrical contacts 133a, 133b such that an electrical connection is made between the first and second electrical contacts 133a, 133b. This may close a switch defined by the sensing membrane 136 and therefore trigger the switch event.

Figure 6D:
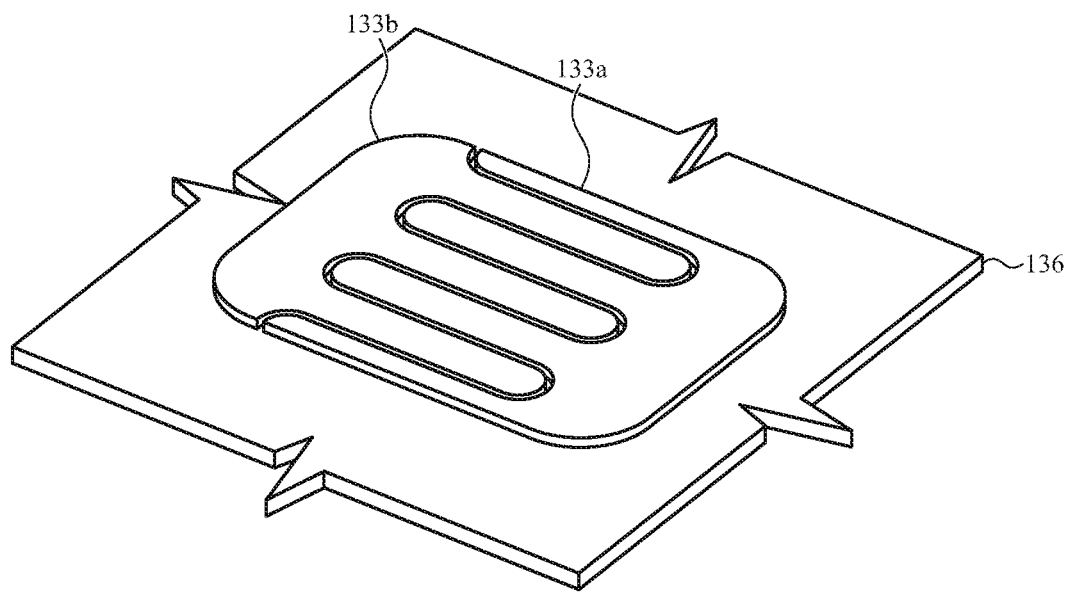
FIG. 6D depicts a perspective view of the sensing membrane FIG. 6C.

With reference to FIG. 6D, the sensing membrane 136, described with respect to the embodiment of FIG. 6C, is shown. In the depicted embodiment, the sensing membrane 136 may include the first and second electrical contacts 133a, 133b defined along a surface of the sensing membrane 136, for example, such as a top surface positioned along an underside of the tactile dome 132. The first and second electrical contacts 133a, 133b may be separated from one another along the surface of the sensing membrane 136 and define respective terminals of a switch. In this regard, a circuit or switch may be completed when the electrically conductive puck 135 described with respect to FIG. 6C spans the gap and contacts the first and second electrical contacts 133a, 133b. In one embodiment, as shown in FIG. 6D, the first and second electrical contacts 133a, 133b may form complementary comb-like structures, each with interposed teeth that extend toward, and partially within, the other of the comb-like structures. This may help maximize the regions defined on the sensing membrane 136 when the electrically conductive puck 135 may strike to trigger a switch event. For example, the electrically conductive puck 135 may strike any two of the interposed teeth of the complementary comb-like structures formed by the first and second electrical contacts 133a, 133b to trigger a switch event.

Figure 7A:
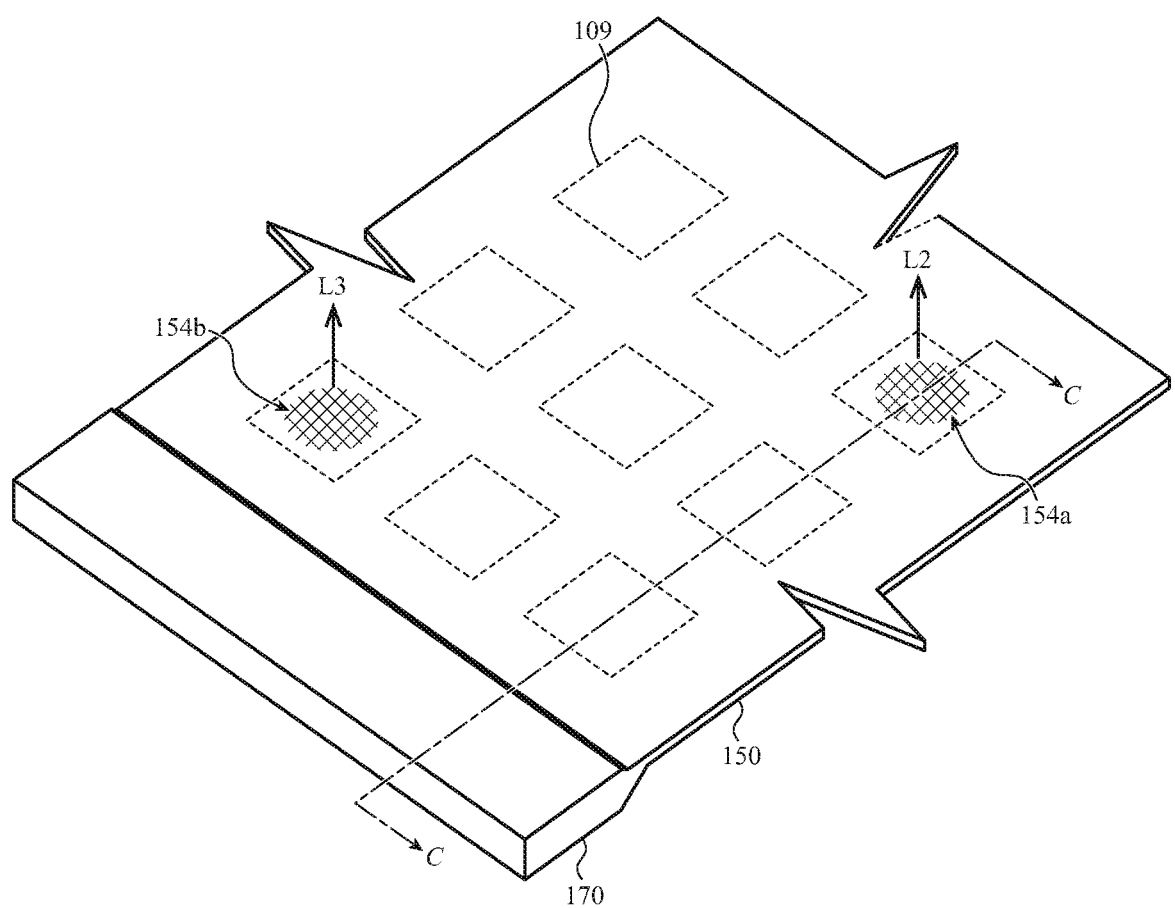
FIG. 7A depicts a light guide panel of the key assembly of FIG. 2A.
Figure 7B:
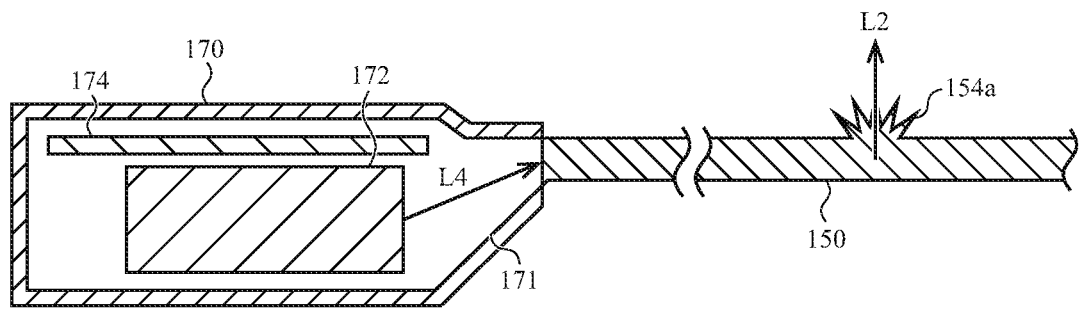
FIG. 7B depicts a cross-sectional view of the light guide panel of FIG. 7A, taken along line C-C of FIG. 7A.
Figure 7C:
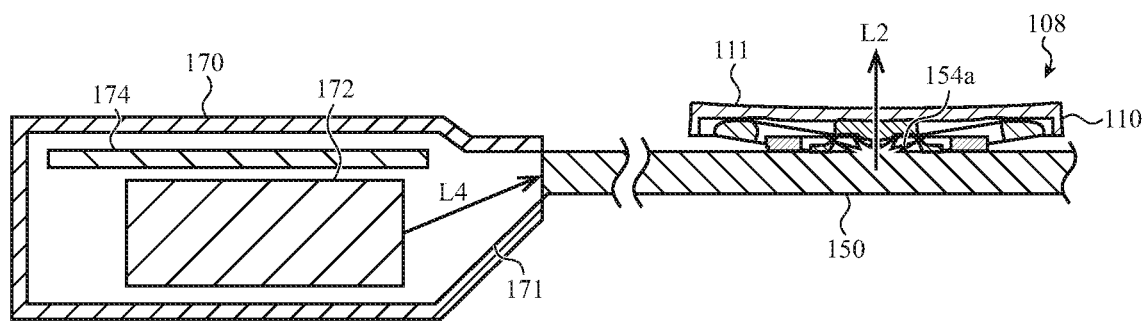
FIG. 7C depicts a cross-sectional view of the light guide panel of FIG. 7A positioned below a key assembly, taken along line C-C of FIG. 7A.

FIGS. 7A-7C depict the LGP 150 described with respect to FIGS. 2A and 2B. In particular, FIGS. 7A and 7B depict the LGP 150 in a configuration in which the LGP 150 illuminates multiple different key assemblies across a keyboard.

With reference to FIG. 7A, the LGP 150 is shown extending across multiple key assembly regions 109. The key assembly regions 109 may correspond to regions of the electronic device 104 (described with respect to FIG. 1) having a distinct key assembly (such as key assembly 108) or a distinct key of the keyboard. The LGP 150 may be connected to a light housing 170 along a periphery of the key assembly region 109. The light housing 170, as described in greater detail below with respect to FIGS. 7B and 7C, may contain various light sources or light emitting elements that may couple light directly into the LGP 150. This may allow the LGP 150 to direct light from the light housing 170 toward various ones of the key assembly region 109, and ultimately illuminate illuminable symbols of corresponding key caps associated with the key assembly region 109.

As described with respect to FIGS. 2A and 2B, the LGP 150 may define or be coupled with light extraction features. The light extraction features may be used to expel light from the LGP 150 and direct the expelled light toward a key cap or other appropriate portion of a key assembly. The LGP 150 may have multiple light extraction features that allow the LGP 150 to direct light toward individual key assemblies, such as distinct pairs of key assemblies. For purposes of illustration, the LGP 150 is shown in FIG. 7A as having a first light extraction feature 154a and a second light extraction feature 154b. However, it will be appreciated that the LGP 150 may have additional light extraction features, including having separate and distinguishable light extraction features at each of the key assembly regions 109.

The light extraction features 154a, 154b may be lenses, textured surfaces, apertures, or other features of the LGP 150. As shown in the embodiment of FIG. 7A, the first light extraction feature 154a may be positioned along the LGP 150 at or near a first of the key assembly regions 109 and the second light extraction feature may be positioned along the LGP 150 at or near a second of the key assembly regions 109. The first light extraction feature 154a may direct light from the LGP 150 along light path L2 and the second light extraction feature 154b may direct light from the LGP 150 along light path L3. The light path L2 may be used to illuminate a first illuminable symbol of a key cap associated with the first of the key assembly regions 109 and the light path L3 may be used illuminate a second illuminable symbol of a key cap associated with the second of key assembly regions 109.

The LGP 150 may be configured to illuminate the first of the key assembly regions 109 in a manner that is distinct from a second of the key assembly region 109. For example, the first and second light extraction features 154a, 154b may exhibit distinct optical characteristics that direct light from the LGP 150 in distinct manners. For example, the first light extraction feature 154a may exhibit or define a first light path, brightness, interference pattern, and so on, and the second light extraction feature 154b may exhibit or define a distinct second light path, brightness, interference pattern, and so on.

The optical characteristics of the first and second light extraction features 154a, 154b may be specifically tailored to a particular illuminable symbol of the key caps associated with the key assembly regions 109. This may allow the LGP 150 to optimally or maximally illuminate the illuminable symbol according to a size, shape, contour, or the like of the illuminable symbol, which may be different for each key cap across the key assembly regions 109. As a sample illustration, the optical characteristics exhibited by the first light extraction feature 154a may be configured to illuminate an illuminable symbol indicative of the letter "A," whereas the optical characteristics exhibited by the second light extraction feature 154b may be configured to illuminate an illuminable symbol indicative of the letter "B." However, in other embodiments, the light extraction features may be configured to illuminate various other alpha-numeric characters, or other symbols, glyphs, or the like. Additionally or alternatively, the first and second light extraction features 154a, 154b may be configured to compensate for other transparent and non-transparent components of a key assembly that may impact the illumination of the illuminable symbol.

With reference to FIG. 7B, a cross-sectional view of the LGP 150 and the light housing 170 is shown. The light housing 170 may be positioned along a periphery of the key assembly region 109 and contain one or more light sources or light emitting elements. For example, as shown in FIG. 7B, the light housing 170 may include light source 172. The light source 172 may be a light emitting diode (LED), micro-LED, liquid crystal display (LCD) element, organic light emitting diode (OLED), or other light emitting element that generates light. The light source 172 may be coupled with an electrical component 174 positioned within the light housing 170. The electrical component 174 may be a printed circuit board (PCB), substrate, switch, or other component, which may be coupled with a processing unit and/or other component with appropriate control logic that is used to selectively operate the light source 172.

The light housing 170 may be configured to direct light from the light source 172 into the LGP 150. For example, the light housing 170 may form an opaque or light-blocking shell around the light source 172 that may substantially inhibit the leakage of light from the light housing 170. To facilitate the foregoing, an outer perimeter of the light housing 170 may be coated, positioned along, and/or encapsulated within a non-transparent or opaque masking layer. Further, the light housing 170 may include angled surface 171, which may also help channel light toward, and into, the LGP 150. In particular, the light source 172 may have a thickness that is greater than the LGP 150, and thus the light housing 170 may also be generally thicker than the LGP 150 to receive and contain the light source 172. The angled surface 171 may therefore be a tapered surface of the light housing 170 that extends between a lower surface of the light housing 170 and a lower surface of the LGP 150. Light emitted from the light source 172 may be redirected by the angled surface 171 into the LGP 150. For example, as shown in FIG. 7B, the light source 172 may emit light generally along light path L4, which may be channeled into the LGP 150 at least in part by angled surface 171.

With reference to FIG. 7C, the key assembly 108 is shown in a configuration in which the LGP 150 is used to illuminate the illuminable symbol 111. The LGP 150 may be used to direct light from the light source 172 toward the illuminable symbol 111 of the key assembly 108. For example, as described above with respect to FIG. 7B, the light source 172 may emit light substantially along light path L4. The light path L4, due in part to the light housing 170 and the angled surface 171, may couple light emitted from the light source 172 into the LGP 150. The LGP 150 may propagate light through the keyboard in order to illuminate various illuminable features of the keyboard, such as illuminable symbol 111 of the key assembly 108.

In particular, light may propagate through the LGP 150 until the light reaches one or more of the light extraction features described herein, for example, such as light extraction features 154a, 154b described with respect to FIG. 7A. As shown in FIG. 7C, the LGP 150 may include the light extraction feature 154a. The light extraction feature 154a may be positioned below the key assembly 108. The light extraction feature 154a, as described above, may expel light from the LGP 150 and direct the expelled light toward the illuminable symbol 111. For example, the light extraction feature 154a may direct light substantially along light path L2. The light path L2 may pass through the key assembly 108, including through various transparent regions of the key assembly 108 (e.g., optionally including a light-transmissible tactile dome, switch housing, and so on). This may cause the illuminable symbol 111 to illuminate along a surface of the key cap 110.

Figure 8A:
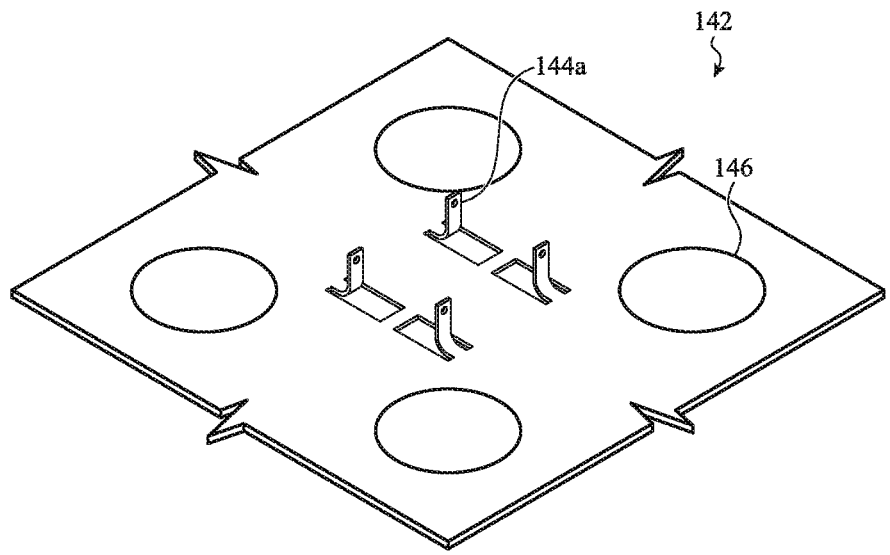
FIG. 8A depicts an embodiment of a feature plate.
Figure 8B:
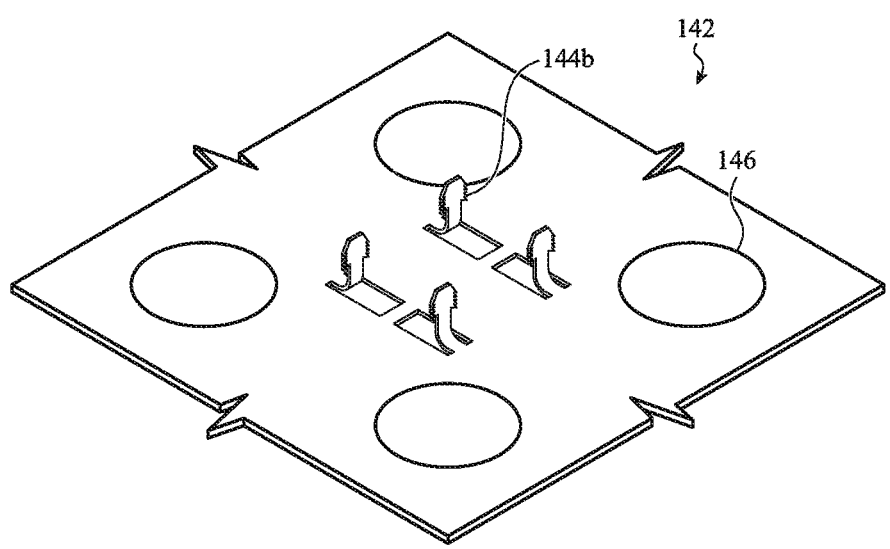
FIG. 8B depicts another embodiment of a feature plate.

FIGS. 8A and 8B depict the feature plate 142 described with respect to FIGS. 2A and 2B. In particular, FIGS. 8A and 8B depict the feature plate 142 having various embodiments of engagement structures that may be used to secure the switch housing 128 within the key assembly 108.

With reference to FIG. 8A, the feature plate 142 is shown as having engagement structures 144a. The engagement structures 144a may be tabs, projections, protrusions, or other like structures that extend from a top surface of the feature plate 142. The engagement structures 144a may be a stamped or cut out feature of the sheet metal used to form the feature plate 142. For example, the engagement structures 144a may be a stamped or cut out portion of the sheet metal used to form the feature plate 142 that are subsequently bent or otherwise manipulated to extend from the top surface of the feature plate 142.

The engagement structures 144a may be used to engage or secure one or more components within a key assembly (e.g., key assembly 108 of FIG. 2A). For example, the engagement structures 144a may be used to secure a switch housing or support structure within the key assembly 108. To facilitate the foregoing, the engagement structures 144a may have one or more holes, openings, apertures, or the like that may be configured to receive one or more features (e.g., a pin, rod, clip, threaded feature, and/or other feature) in order to secure a particular component within a key assembly.

With reference to FIG. 8B, the feature plate 142 is shown as having engagement structures 144b. The engagement structures 144b may be tabs, projections, protrusions, or other like structures that extend from a top surface of the feature plate 142. The engagement structures 144b may be a stamped or cut out feature of the sheet metal used to form the feature plate 142. For example, the engagement structures 144b may be a stamped or cut out portion of the sheet metal used to form the feature plate 142 that are subsequently bent or otherwise manipulated to extend from the top surface of the feature plate 142.

The engagement structures 144b may be used to engage or secure one or more components within a key assembly (e.g., key assembly 108 of FIG. 2A). For example, the engagement structures 144b may be used to secure a switch housing or support structure within the key assembly 108. To facilitate the foregoing, the engagement structures 144b may include or define a barb, angular, or other serrated structure or edge. This may allow the engagement structures 144b to extend into, for example, an underside of a switch housing and prevent subsequent movement of the switch housing using the serrated edge. In particular, the engagement structure 144b may include a serrated edge configured to allow the engagement structures 144a to pierce the underside surface of the switch housing and advance therein, while substantially preventing the feature plate 142 from exiting the switch housing.

Figure 9:
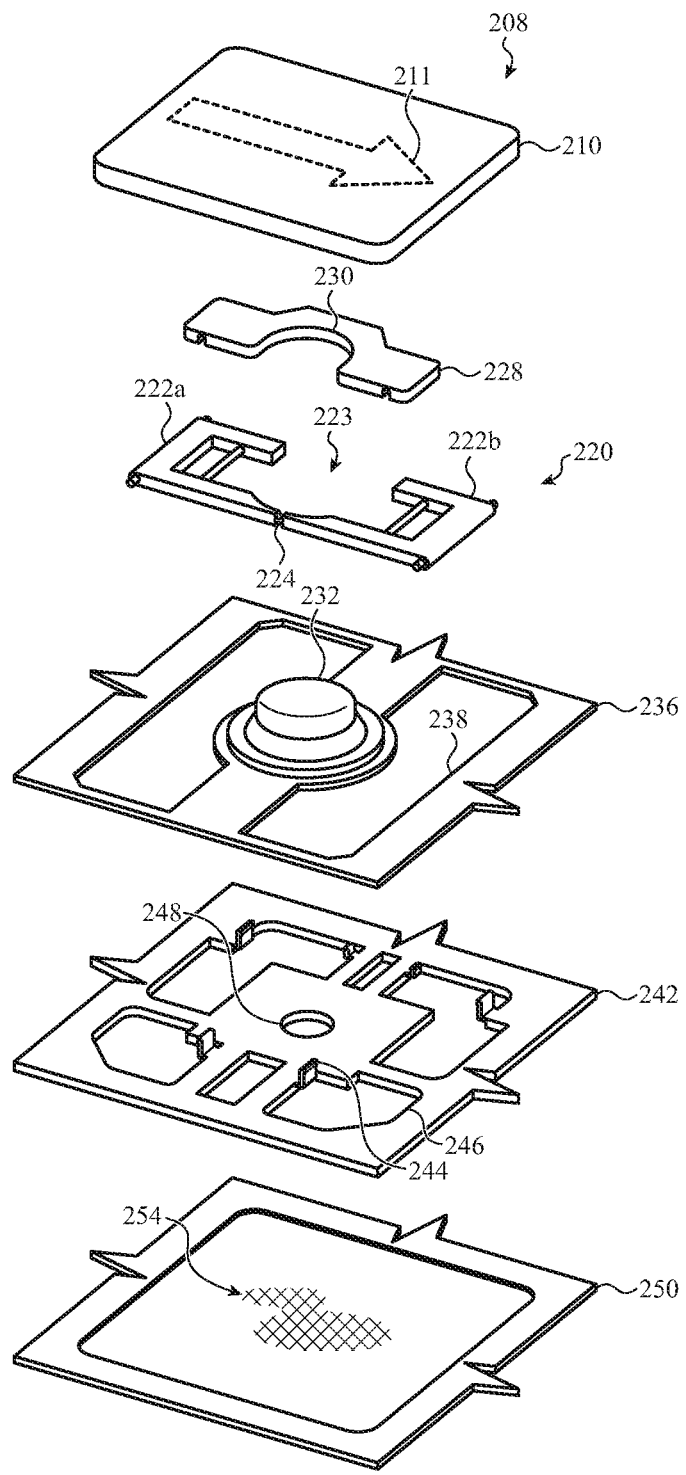
FIG. 9 depicts an exploded view of another embodiment of a key assembly of FIG. 1.
Figure 10:
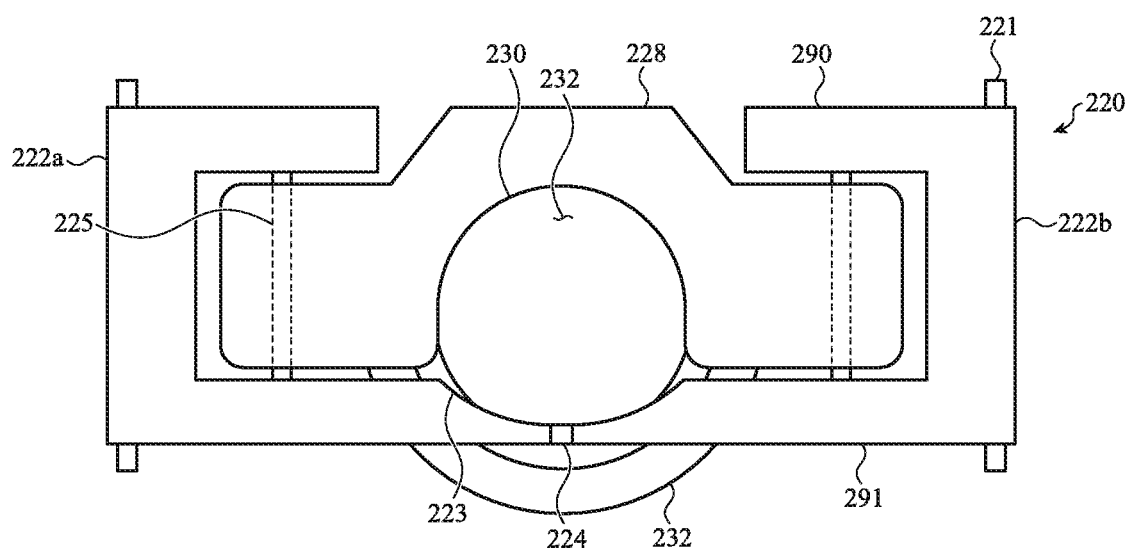
FIG. 10 depicts a top view of the modified-support structure mechanism and modified switch housing of FIG. 9.

FIGS. 9 and 10 depict a key assembly 208. The key assembly 208 may be configured to operate in a manner substantially analogous to the key assembly 108 described with respect to FIG. 2A. For example, the key assembly 208 may be configured to receive a force input or mechanical press that is used to collapse or buckle a tactile dome or other element of a tactile switch. Upon buckling, the tactile dome may contact a sensing membrane or other contact-based sensing component and trigger a switch event that may be used to control a function of a computing device (e.g., electronic device 104 of FIG. 1). Accordingly, the key assembly 208 may include similar components as that of key assembly 108, including: key cap 210; illuminable symbol 211; tactile dome 232; sensing membrane 236; series of membrane openings 238; feature plate 242; engagement structures 244; series of feature plate openings 246; relief 248; LGP 250; and light extraction feature 254.

Notwithstanding the foregoing, as shown in FIG. 9, the key assembly 208 may include a modified-support structure 220 that is pivotally coupled with a modified switch housing 228 below the key cap 210. The half-support structure 220 may be used to support smaller keys of a keyboard, such as key cap 210, which may correspond to an arrow key, although other keys, including larger keys, may be used. The smaller size of the key may limit the available volume for components of the key assembly 208. The modified-support structure 220 and the modified switch housing 228 may help accommodate a relatively larger tactile dome for the smaller key, and may therefore contribute to delivering a desired tactile effect when the smaller key is depressed.

The modified-support structure 220 may include wings 222a, 222b that are pivotally coupled about a hinge 224. Substantially analogous to the wings 122a, 122b and hinge 124 described with respect to FIGS. 2A and 2B, the wings 222a, 222b may be a pair of wings that are overmolded components molded over the hinge 224. The hinge 224 may be formed from a compliant material. In the embodiment of FIG. 9, however, the hinge 124 may only be present on one side of the modified-support structure 220 (e.g., the wings 222a, 222b may be connected via a single structure). The wings 222a, 222b may cooperate to define a cavity 223. Rather than be encircled or enclosed by the wings 222a, 222b, the cavity 223 may be open along a first side of the modified-support structure 220 and closed or otherwise defined by the hinge 224 on a second, opposing side of the modified-support structure 220.

The modified switch housing 228 may be configured to be positioned within the cavity 223 defined by the wings 222a, 222b. The modified switch housing 228 may include various retention features or the like that are configured to receive a portion of the wings 222a, 222b and support the wings 222a, 222b with the key assembly 208 as the key cap 210 is depressed. The modified switch housing 228 may include a recess 230. The recess 230 may be a semi-circular recess or other recess defined by a curved edge of the modified switch housing 228. The recess 230 and the cavity 223 may cooperate to allow the tactile dome 232 to extend between the modified-support structure 220 and the modified switch housing 228.

With reference to FIG. 10, the modified-support structure 220 is shown pivotally coupled with the modified switch housing 228. As shown in FIG. 10, each of the wings 222a, 222b may include non-symmetric arms that allow the wings 222a, 222b to be pivotally connected to one another about one side of the modified-support structure 220 (e.g., about hinge 224) and allow the modified switch housing 228 to be positioned within the cavity 223. For example, the wings 222a, 222b may each include a major arm 291 and a minor arm 290. The minor arm 290 may be shorter or smaller than the major arm 291. The minor arm 290 may define a free end of a respective one of the wings 222a, 222b that is not pivotally coupled or overmolded with a compliant hinge. The major arm 291 of the respective one of the wings 222a, 222b may be an overmolded structure that is molded over the hinge 224.

Each of the wings 222a, 222b may include a cross-support 225. The cross-support 225 may extend between the respective ones of the major arm 291 and the minor arm 290. The cross-support 225 may be used to pivotally couple the modified-support structure 220 with the modified switch housing 228, or a portion thereof. For example, the cross-support 225 may extend across and through the modified switching housing 228. The modified switch housing 228 may be configured to allow the cross-support 225 to rotate and/or translate within the modified switch housing 228 in response to a depression of the key cap 210. In this regard, the modified-support structure 220 may also include key cap engagement structures 221 that extend from the wings 222a, 222b and are configured to pivotally engage a key cap as it is depressed into the key assembly 208 and toward the tactile dome 232.

Figure 11:
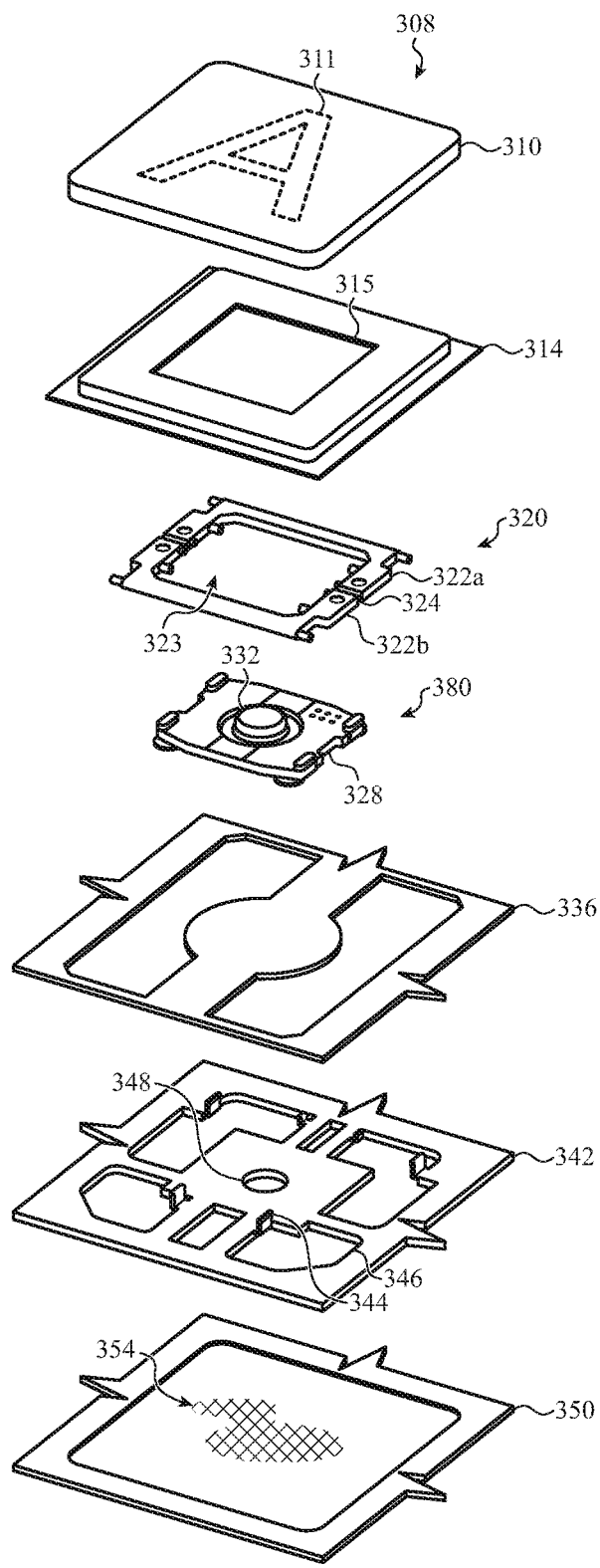
Figure 12:
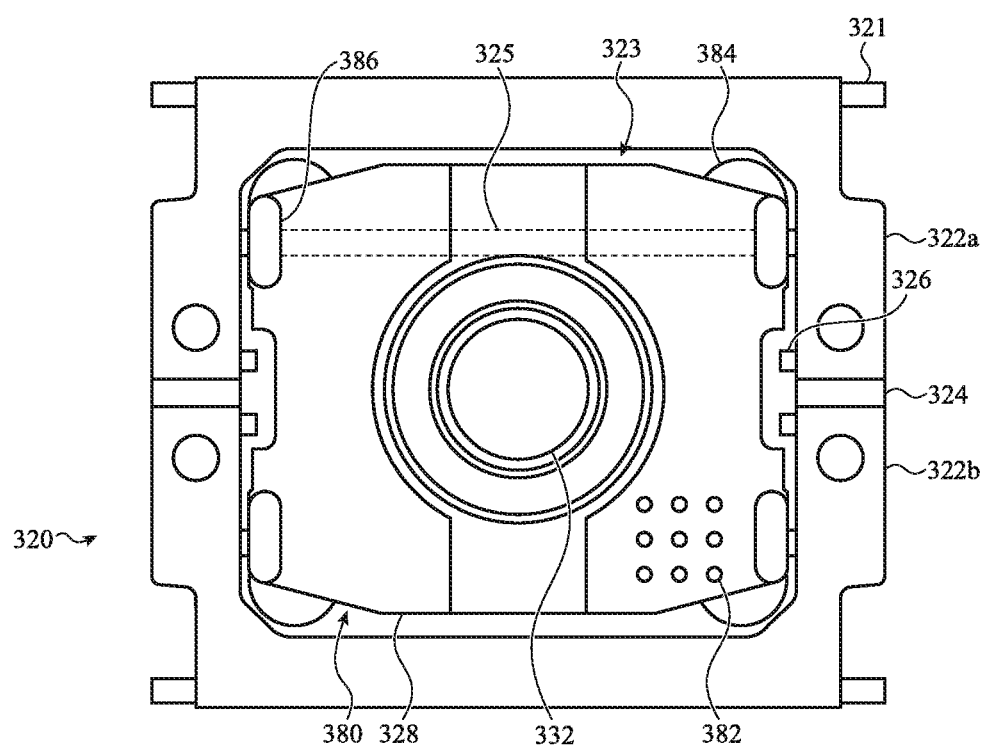
FIG. 12 depicts a top view of the dome integrated switch housing and support structure mechanism of FIG. 10.

FIGS. 11 and 12 depict a key assembly 308. The key assembly 308 may be configured to operate in a manner substantially analogous to the key assembly 108 described with respect to FIG. 2A. For example, the key assembly 308 may be configured to receive a force input or mechanical press that is used to collapse or buckle a tactile dome or other element of a tactile switch. Upon buckling, the tactile dome may contact a sensing membrane or other contact-based sensing component and trigger a switch event that may be used to control a function of a computing device (e.g., electronic device 104 of FIG. 1). Accordingly, the key assembly 308 may include similar components as that of key assembly 308, including: key cap 310; illuminable symbol 311; collar 314; key opening 315; support structure 320; wings 322a, 322b; hinge 324; sensing membrane 336; series of membrane openings 338; feature plate 342; engagement structures 344; series of feature plate openings 346; relief 348; LGP 350; and light extraction feature 354.

Notwithstanding the foregoing, the key assembly 308 includes a dome integrated switch housing 380, as depicted in FIG. 11. The dome integrated switch housing 380 may be positioned above the sensing membrane 336 and used to support the support structure 320 within the key assembly 308. In this regard, the dome integrated switch housing 380 may be a structural portion of the key assembly 308 that contains a deformable tactile dome or other tactile switch element used to detect actuation of the key cap 310. The dome integrated switch housing 380 may also include various light extraction or illumination features that may direct light toward the illuminable symbol 311 of the key cap 310.

As shown in FIG. 11, the dome integrated switch housing 380 may include an overmolded switch housing 328 and a tactile dome 332. The overmolded switch housing 328 may be an overmolded component that is overmolded over a portion of the tactile dome 332 (e.g., such as about a periphery of the tactile dome 332). In this regard, the overmolded switch housing 328 may be used to support the tactile dome 332 within the key assembly 308. The tactile dome 332 may be a deformable portion of the dome integrated switch housing 380 that may collapse or buckle in response to an applied force. In this regard, the tactile dome 332 may be used to contact the sensing membrane 336 positioned below the dome integrated switch housing 380 and trigger a corresponding switch event.

With reference to FIG. 12, the dome integrated switch housing 380 is shown pivotally coupled with the support structure 320. In the embodiment of FIG. 12, the support structure 320 may include cross-supports 325. The cross-supports 325 may extend through the cavity 323 between arms of each of the wings 322a, 322b of the support structure 320. The cross-supports 325 may be received by a retention feature or other recess, cavity, opening, through portion, or the like of the dome integrated switch housing 380. As shown in FIG. 12, the cross-supports 325 may extend through the dome integrated switch housing 380; however, in other cases, the cross-supports 325 may extend partially through and/or along an exterior surface of the dome integrated switch housing 380. As such, the dome integrated switch housing 380 may be configured to allow the cross-supports 325 to rotate and/or pivot within the dome integrated switch housing 380 during depression of the key cap 310. In this regard, the support structure 320 may also include key cap engagement structures 321 that may be configured to pivotally couple with the key cap 310 positioned above the dome integrated switch housing 380.

The overmolded switch housing 328 may be a structural component of the key assembly 308. For example, the overmolded switch housing 328 may structurally support the tactile dome 332 within the key assembly 308. For example, the overmolded switch housing 328 may include or define feet 384, as depicted in FIG. 12. The feet 384 may be configured to be secured to or received by the feature plate 342 and/or other components of the key assembly 308, which may help secure the dome integrated switch housing 380 within the key assembly 308. (e.g., the feet 384 may be coupled with the engagement structures 344, described with respect to FIG. 11A).

Further, the overmolded switch housing 328 may also serve to enhance the acoustic performance of the key assembly 308. In an embodiment, the overmolded switch housing 328 may include posts 386. The posts 386 may be constructed from rubber or other acoustically insulating materials. The posts 386 may extend from a top surface of the overmolded switch housing 328. The posts 386 may have a height or other dimension such that the key cap 310 impacts the posts 386 upon actuation. This may help dampen the sound associated with a key stroke.

The overmolded switch housing 328 may also include or define various light channels 382. The light channels 382 may be configured to receive light from the LGP 350 positioned below the dome integrated switch housing 380 and direct the received light toward the illuminable symbol 311. In this regard, the overmolded switch housing 328 may be used to illuminate the illuminable symbol 311 of the key cap 310. In some cases, the light channels 382 may exhibit various properties, including defining a distinct light path, brightness, interference pattern, and so on that may be used to illuminate the illuminable symbol 311 in a manner corresponding to a shape, size, contour, or the like of the illuminable symbol 311.

Figure 13:
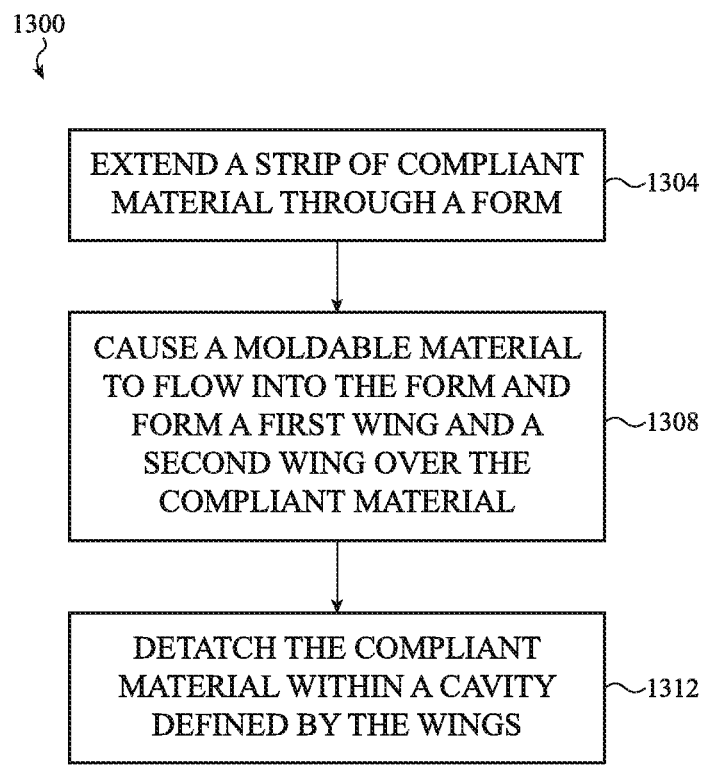
FIG. 13 is a flow diagram of a method for manufacturing a support structure mechanism.

To facilitate the reader's understanding of the various functionalities of the embodiments discussed herein, reference is now made to the flow diagram in FIG. 13, which illustrates process 1300. While specific steps (and orders of steps) of the methods presented herein have been illustrated and will be discussed, other methods (including more, fewer, or different steps than those illustrated) consistent with the teachings presented herein are also envisioned and encompassed with the present disclosure.

In this regard, with reference to FIG. 13, process 1300 relates generally to a method of manufacturing a support structure. The process 1300 may be used to manufacture any of the support structure described herein, for example, such as support structure 120 and support structure mechanism 320.

At operation 1304, a strip of compliant material may extend through a form. For example and with reference to FIGS. 4A-4C, the strip of compliant material 160 may be extended through a form. For example, the strip of compliant material 160 may be advanced into a form resembling the shape of a support structure wing using the alignment holes 162. In some cases, the alignment holes 162 may be configured to receive a pin, bar, or other advancement feature that causes the strip of compliant material 160 to advance into the form and extend entirely across a longitudinal dimension of the form.

At operation 1308, a moldable material may be caused to flow into the form and form a first wing and a second wing over the compliant material. In particular, the first wing may be molded over a first edge of the strip of compliant material and the second wing may be molded over a second edge of the strip of compliant material. For example, and with reference to FIGS. 4A-4C, an injection moldable material may be caused to flow into a form and envelop a portion of the strip of compliant material 160. The form may resemble the shape of the wings 122a, 122b such that the injection moldable material envelops the strip of compliant material 160 and forms the wings 122a, 122b along opposing sides of the strip of compliant material 160. The resulting wings 122a, 122b may be separated from one another by joint 127, which may correspond to a portion of the strip of compliant material 160 having no or minimal overmolded structure. As such, the wings 122a, 122b may pivot relative to one another about the joint 127.

In order to form the wings 122a, 122b, the injection moldable material may be optionally cured within the form to achieve a desired mechanical or physical characteristic of the wings 122a, 122b. This may involve inducing various temperature variations within the form such that the wings 122a, 122b exhibit a hardness greater than that of the strip of compliant material 160. Due at least in part to the potential temperature variations, the strip of compliant material 160 may be formed from a heat-resistant material that inhibits physical or chemical changes of the strip of compliant material during curing and/or other steps used to produce the support structure 120.

At operation 1312, the compliant material may be detached from within a cavity defined by the wings of the support structure. For example, and with reference to FIGS. 4A-4C, the strip of compliant material 160 may be removed or detached from the wings 122a, 122b to reveal a completed support structure 120. The strip of compliant material 160 may be removed by various techniques, including mechanical and chemical treatments. In some cases, the strip of compliant material 160 may be detached or removed from a set of support structures 120' in order to facilitate the manufacture of multiple support structure along a single, continuous strip of compliant material.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A keyboard, comprising:
an enclosure defining an array of openings;
a key assembly positioned within a first opening of the array of openings, the key assembly comprising:
a key cap;
a support structure coupled to the key cap;
a switch housing pivotally coupled with the support structure, the switch housing having a bottom surface;
a sensing membrane having a set of openings; and
a feature plate having a set of engagement features that extend through the set of openings of the sensing membrane and through the bottom surface of the switch housing to operably couple the switch housing to the feature plate, the bottom surface extending parallel to and facing the feature plate.

2. The keyboard of claim 1, wherein the set of engagement features comprise barbs or tabs.

3. The keyboard of claim 1, wherein the set of engagement features are cut, stamped, or bent out of a body used to form the feature plate.

4. The keyboard of claim 3, wherein the set of engagement features contact a set of feet defined by the bottom surface of the switch housing.

5. The keyboard of claim 1, wherein the feature plate defines a relief configured to receive a portion of the sensing membrane upon actuation of the key assembly.

6. The keyboard of claim 1, wherein:
the support structure comprises a first wing and a second wing, the first wing and second wing being coupled together by a living hinge;
the switch housing is positioned within a cavity defined by the first wing, the second wing, and the living hinge; and
the key assembly further comprises a tactile dome positioned within a switch opening defined by the switch housing.

7. The keyboard of claim 1 further comprising:
a light source positioned within the enclosure and along a periphery of the key assembly; and
a light guide optically coupled with the light source and extending below the key assembly, wherein the light guide is configured to illuminate an illuminable symbol of the key cap.

8. A key for a keyboard, comprising:
a key cap;
a tactile switch;
a support structure supporting the key cap above the tactile switch, the support structure including:
a first wing having a first protrusion and a first upstop feature, the first protrusion defining a pivot axis of the first wing, the pivot axis of the first wing being offset from the first upstop feature; and
a second wing forming a second protrusion and a second upstop feature, the second protrusion defining a pivot axis of the second wing, the pivot axis of the second wing offset from the second upstop feature, the first and second wings defining a cavity, the first and second upstop features extending from the support structure into the cavity;
a sensing membrane positioned below the tactile switch;
a feature plate positioned on an underside of the tactile switch, the feature plate comprising a void vertically aligned with the tactile switch, wherein the void in the feature plate is configured to receive a portion of the sensing membrane while the keycap is in a depressed state; and
a switch housing positioned within the cavity defined by the support structure, the switch housing defining an up stop track which receives the upstop feature of the support structure to limit movement of the support structure.

9. The key of claim 8, wherein:
the sensing membrane comprises a first layer, a second layer, and a spacer;
the spacer is positioned between the first and second layers to form a second cavity.

10. The key of claim 8, wherein the tactile switch is a dome configured to collapse in response to the depression of the key cap.

11. The key of claim 9, wherein deformation of the portion of the sensing membrane into the void triggers a switch event.

12. The key of claim 8 further comprising a light guide defining at least one light extraction feature and configured to propagate light toward an illuminable symbol of the key cap.

13. The key of claim 12, wherein:
the feature plate defines a series of feature plate openings;
the sensing membrane defines a series of membrane openings; and
the light guide is configured to propagate light through at least one of the membrane openings and at least one of the feature plate openings.

14. The keyboard of claim 8, wherein depressing the key cap to the actuated state generates a tactile sensation to a user of the keyboard.

* * * * *